(12) United States Patent
Milko et al.

(10) Patent No.: US 10,743,219 B2
(45) Date of Patent: Aug. 11, 2020

(54) GEOGRAPHIC ROUTING VIA LABELS IN SIP REDIRECT

(71) Applicant: Bandwidth.com, Inc., Raleigh, NC (US)

(72) Inventors: James Milko, Durham, NC (US); Scott Mullen, Holly Springs, NC (US); Richard Revels, Holly Ridge, NC (US); Michael Nelson, Apex, NC (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 16/215,733

(22) Filed: Dec. 11, 2018

(65) Prior Publication Data
US 2020/0187059 A1    Jun. 11, 2020

(51) Int. Cl.
| | |
|---|---|
| H04W 36/00 | (2009.01) |
| H04M 7/12 | (2006.01) |
| H04M 7/00 | (2006.01) |
| H04L 12/66 | (2006.01) |

(52) U.S. Cl.
CPC ......... *H04W 36/0022* (2013.01); *H04L 12/66* (2013.01); *H04M 7/006* (2013.01); *H04M 7/127* (2013.01); *H04W 36/0016* (2013.01)

(58) Field of Classification Search
None
See application file for complete search history.

(56) References Cited

U.S. PATENT DOCUMENTS

| | | | |
|---|---|---|---|
| 6,426,955 B1 * | 7/2002 | Gossett Dalton, Jr. .............. | H04L 12/6418 370/352 |
| 2004/0258239 A1 * | 12/2004 | Gallant .................. | H04L 29/06 370/401 |
| 2005/0195795 A1 * | 9/2005 | Aoki ...................... | H04W 40/02 370/351 |
| 2006/0098619 A1 * | 5/2006 | Nix ........................ | H04M 7/126 370/352 |
| 2007/0104184 A1 * | 5/2007 | Ku ....................... | H04L 29/1216 370/352 |
| 2009/0129580 A1 * | 5/2009 | Terpstra ................. | H04L 45/04 379/232 |
| 2014/0211783 A1 * | 7/2014 | Majd ...................... | H04L 65/80 370/352 |

(Continued)

OTHER PUBLICATIONS

Rosenberg et al., "SIP: Session Initiation Protocol", RFC 3261, Jun. 2002 (Year: 2002).*

*Primary Examiner* — Jenkey Van
(74) *Attorney, Agent, or Firm* — Gregory Stephens

(57) ABSTRACT

Arrangements (e.g., apparatus, method, machine-readable medium, chipset, etc.) guiding selection of a gateway to which to present a hand-off request for an outgoing communication session, including: referencing a gateway database storing gateway data for gateways of plural communication carriers, respectively, the gateway data of each subject gateway including an IP address and at least one connection efficiency value for the subject gateway; and considering connection efficiency values of ones of the gateways of the plural communication carriers in the gateway database according to a predetermined selection criteria, to form an output instruction which guides selection of at least one gateway to which to present the hand-off request.

18 Claims, 15 Drawing Sheets

(56) References Cited

U.S. PATENT DOCUMENTS

2015/0016340 A1* 1/2015 Itoh .................. H04W 36/0011
                                                              370/328
2015/0188949 A1* 7/2015 Mahaffey ................ H04L 63/20
                                                              726/1

* cited by examiner

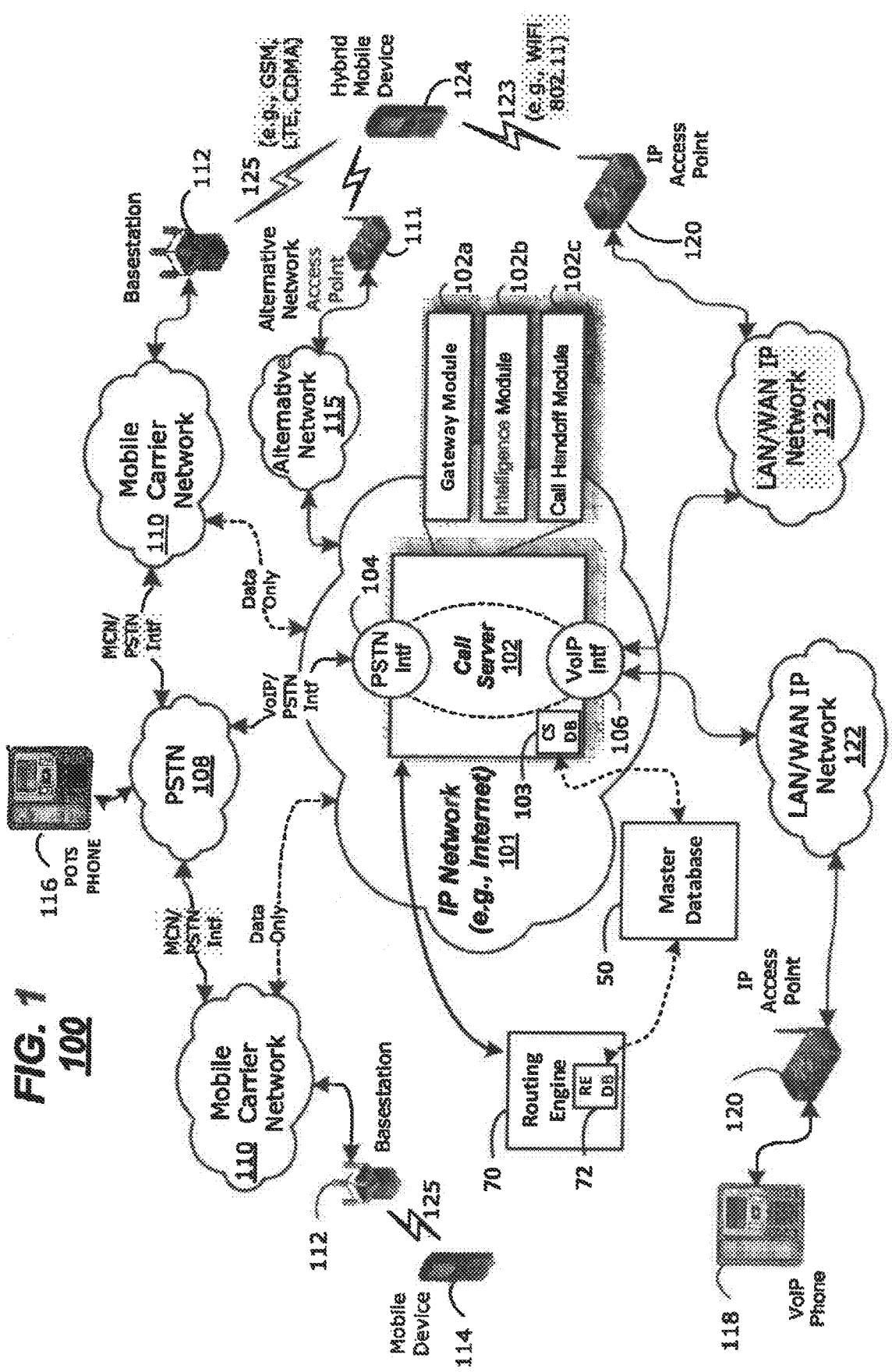

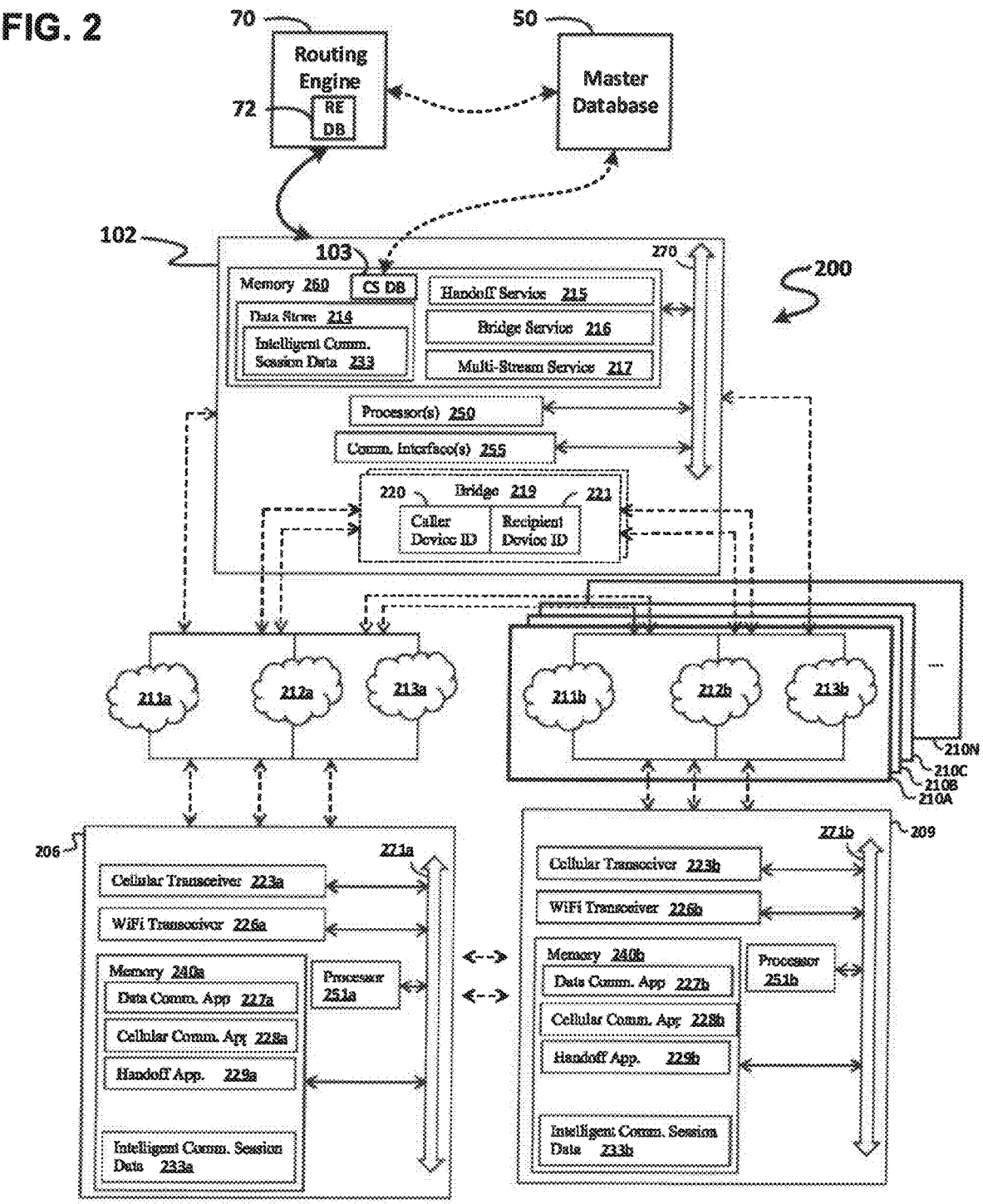

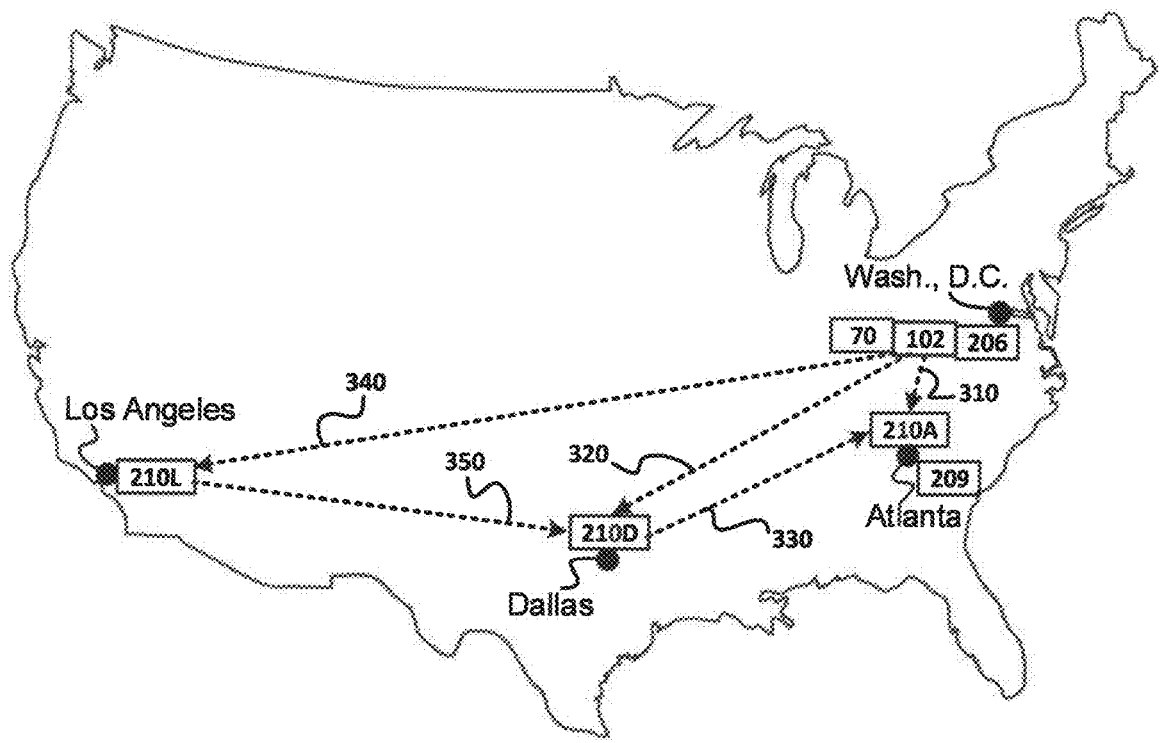

FIG. 6
600

| CALL TO 610 | G-W LOC 620 | G-W ID 630 | IP ADDRESS 640 | DIST 650 | LATENCY 660 | QUALITY 670 | CARRIER 680 | COST 690 | CAP. 695 |
|---|---|---|---|---|---|---|---|---|---|
| ... | ... | ... | ... | ... | ... | ... | ... | ... | ... |
| Atlanta | Atlanta | 210A$_1$ | 67.231.13.135 | 639mi | 200ms | 8 | CAR 1 | 0.015/min | 70% |
| Atlanta | Atlanta | 210A$_6$ | 67.231.1.99 | 642mi | 210ms | 9 | CAR 2 | 0.020/min | 90% |
| Atlanta | Atlanta | 210A$_8$ | 192.168.16.124 | 647mi | 215ms | 9 | CAR 3 | 0.022/min | 85% |
| Atlanta | Atlanta | 210A$_{10}$ | 67.231.1.57 | 649mi | 190ms | 10 | CAR 4 | 0.017/min | 77% |
| Atlanta | Atlanta | 210A$_{11}$ | 67.231.1.52 | 648mi | 210ms | 9 | CAR 5 | 0.018/min | 81% |
| ... | ... | ... | ... | ... | ... | ... | ... | ... | ... |

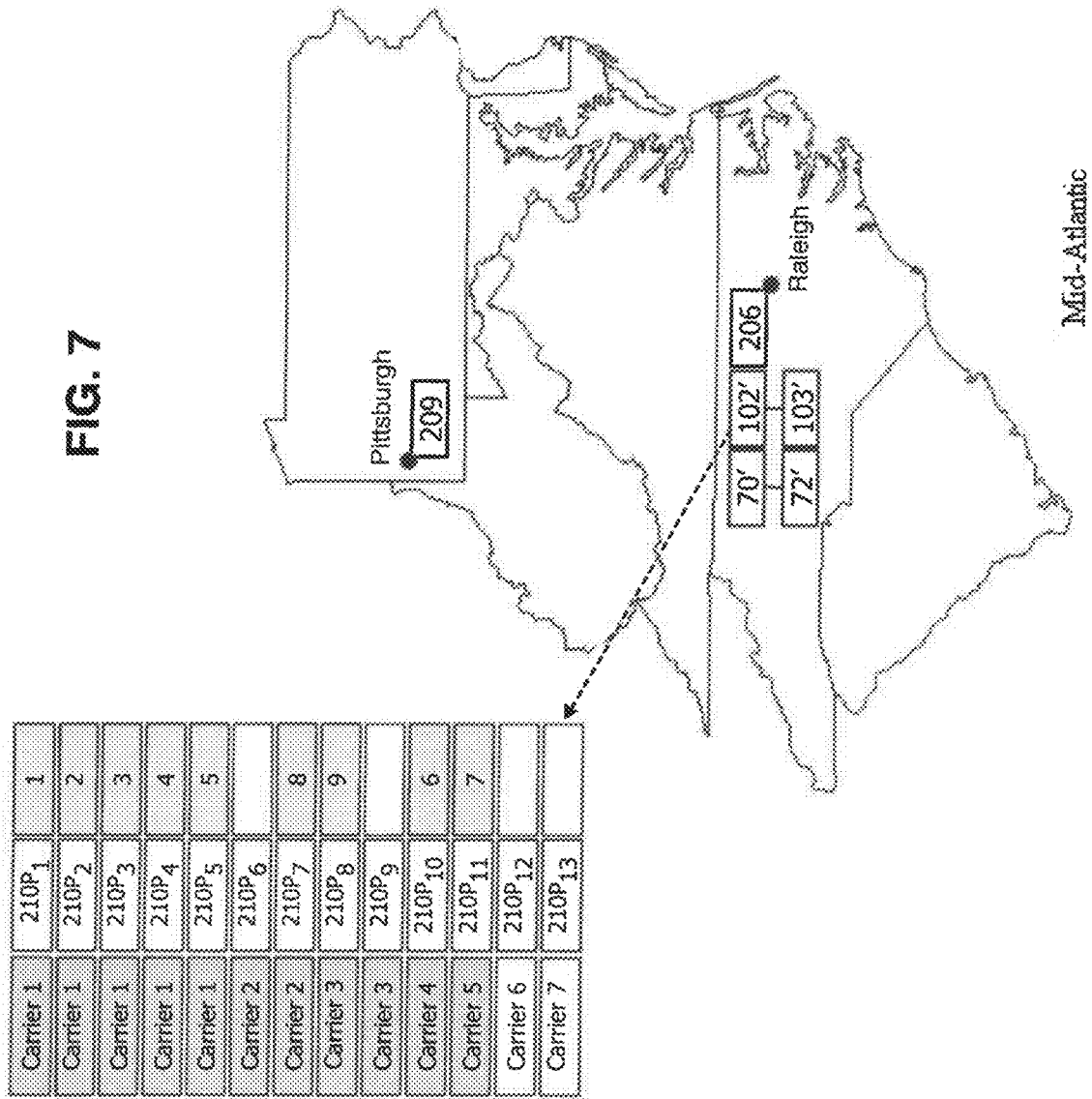

FIG. 8
800

| CALL FR | CALL TO | G-W LOC. | G-W ID | IP ADDRESS | DIST | LATENCY | QUALITY | CARRIER | COST | CAP. |
|---|---|---|---|---|---|---|---|---|---|---|
| ... | ... | ... | ... | ... | ... | ... | ... | ... | ... | ... |
| Raleigh | Pittsburgh | Pittsburgh | 210P$_1$ | 216.231.13.135 | 329mi | 200ms | 8 | CAR 1 | 0.015/min | 70% |
| Raleigh | Pittsburgh | Pittsburgh | 210P$_2$ | 216.231.13.136 | 329mi | 210ms | 8 | CAR 1 | 0.015/min | 78% |
| Raleigh | Pittsburgh | Pittsburgh | 210P$_3$ | 216.231.13.137 | 330mi | 300ms | 7 | CAR 1 | 0.015/min | 65% |
| Raleigh | Pittsburgh | Pittsburgh | 210P$_4$ | 216.231.13.138 | 334mi | 320ms | 6 | CAR 1 | 0.015/min | 58% |
| Raleigh | Pittsburgh | Pittsburgh | 210P$_5$ | 216.231.13.139 | 334mi | 325ms | 6 | CAR 1 | 0.015/min | 54% |
| Raleigh | Pittsburgh | Pittsburgh | 210P$_6$ | 204.231.1.99 | 332mi | 210ms | 9 | CAR 2 | 0.020/min | 90% |
| Raleigh | Pittsburgh | Pittsburgh | 210P$_7$ | 204.231.1.100 | 332mi | 220ms | 8 | CAR 2 | 0.019/min | 88% |
| Raleigh | Pittsburgh | Pittsburgh | 210P$_8$ | 199.168.16.124 | 337mi | 215ms | 9 | CAR 3 | 0.020/min | 85% |
| Raleigh | Pittsburgh | Pittsburgh | 210P$_9$ | 199.168.16.125 | 337mi | 220ms | 8 | CAR 3 | 0.022/min | 83% |
| Raleigh | Pittsburgh | Pittsburgh | 210P$_{10}$ | 128.231.1.57 | 339mi | 190ms | 10 | CAR 4 | 0.017/min | 77% |
| Raleigh | Pittsburgh | Pittsburgh | 210P$_{11}$ | 141.231.1.52 | 338mi | 210ms | 9 | CAR 5 | 0.018/min | 81% |
| Raleigh | Pittsburgh | Pittsburgh | 210P$_{12}$ | 128.231.19.03 | 333mi | 290ms | 7 | CAR 6 | 0.025/min | 89% |
| Raleigh | Pittsburgh | Pittsburgh | 210P$_{13}$ | 141.231.11.23 | 336mi | 265ms | 7 | CAR 7 | 0.028/min | 88% |
| ... | ... | ... | ... | ... | ... | ... | ... | ... | ... | ... |

805 / 810 / 820 / 830 / 840 / 850 / 860 / 870 / 880 / 890 / 895

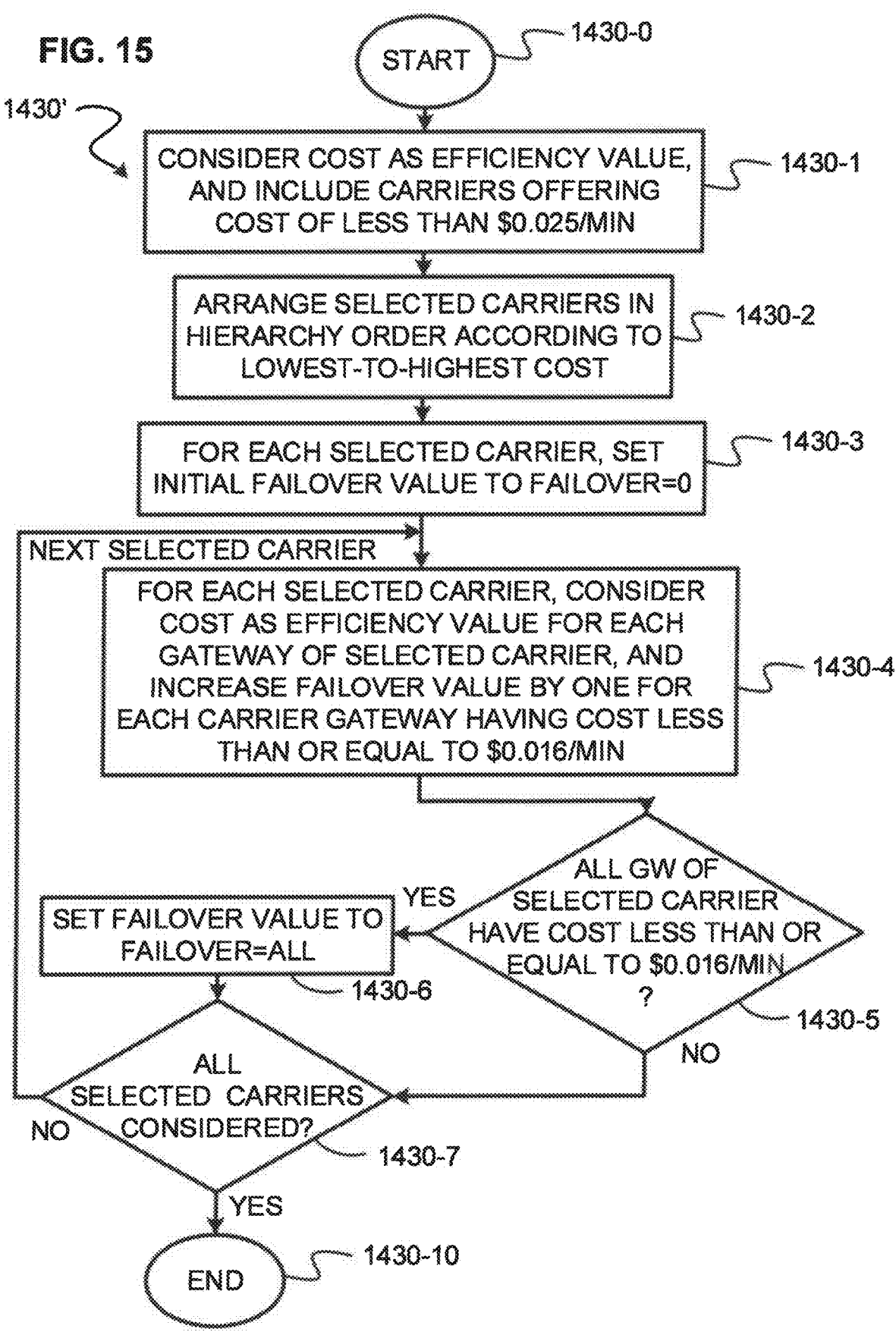

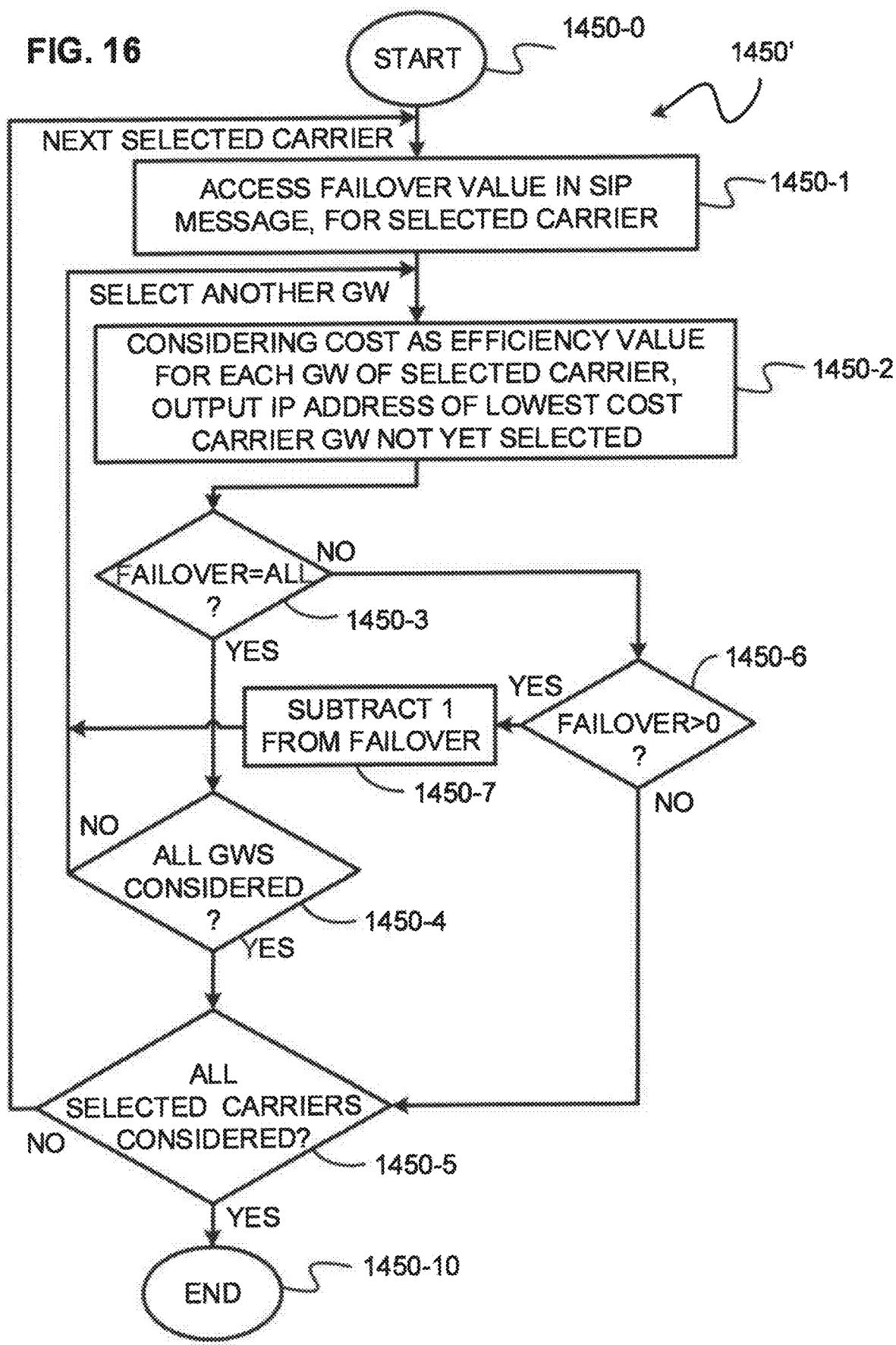

GEOGRAPHIC ROUTING VIA LABELS IN SIP REDIRECT

TECHNICAL FIELD

The present invention relates generally to gateway routing and handoff of outgoing communication requests in a telecommunications infrastructure, and more specifically to geographical and/or inter-network (e.g., inter-carrier) gateway routing and handoff of outgoing communication requests in a telecommunications infrastructure.

BACKGROUND

Modern telecommunication infrastructure may include a plurality of geographically-distributed networks (e.g., cellular networks, Voice-over-IP (VoIP) networks, plain old telephone service (POTS) networks and/or alternative networks), which networks may be owned by varying different carriers or service providers. Communication sessions conducted across the telecommunication infrastructure may be, for example, a phone call, video call, text message, or multimedia message. Many outgoing communication sessions are eventually interfaced (e.g., routed through and handed-off) at a geographically-distanced gateway to allow for communication across distinct networks, e.g., from one carrier's network to another carrier's network.

There always exists a need for more efficient methods, apparatus, programs, techniques, etc., which can provide more efficient gateway routing and handoffs of outgoing communication requests, including from one carrier's network to another. Described herein are methods, systems, programs and techniques for intelligently enhancing handoff decisions and operations, to result in improved efficiency for both the carrier and the subscriber.

BRIEF DESCRIPTION OF THE DRAWINGS

FIG. 1 illustrates an example networked environment for implementing certain example embodiments of the present disclosure.

FIG. 2 illustrates an example networked environment for implementing certain example embodiments of the present disclosure.

FIG. 3 illustrates an example map of plural geographical areas and gateways, which is useful in explaining example embodiments of the present disclosure.

FIG. 4 illustrates an example table of data, which is useful in explaining the FIG. 3 example embodiment.

FIG. 6 illustrates an example table of data, which is useful in explaining the FIG. 5 example embodiment.

FIG. 7 illustrates an example map of plural geographical areas and gateways, which is useful in explaining example embodiments of the present disclosure.

FIG. 8 illustrates an example table of data, which is useful in explaining the FIG. 7 example embodiment.

FIGS. 15-16 illustrate flow or logic examples which are useful in explaining example details with respect to operations of the FIG. 14 flow logic example.

DETAILED DESCRIPTION

Figure 5:
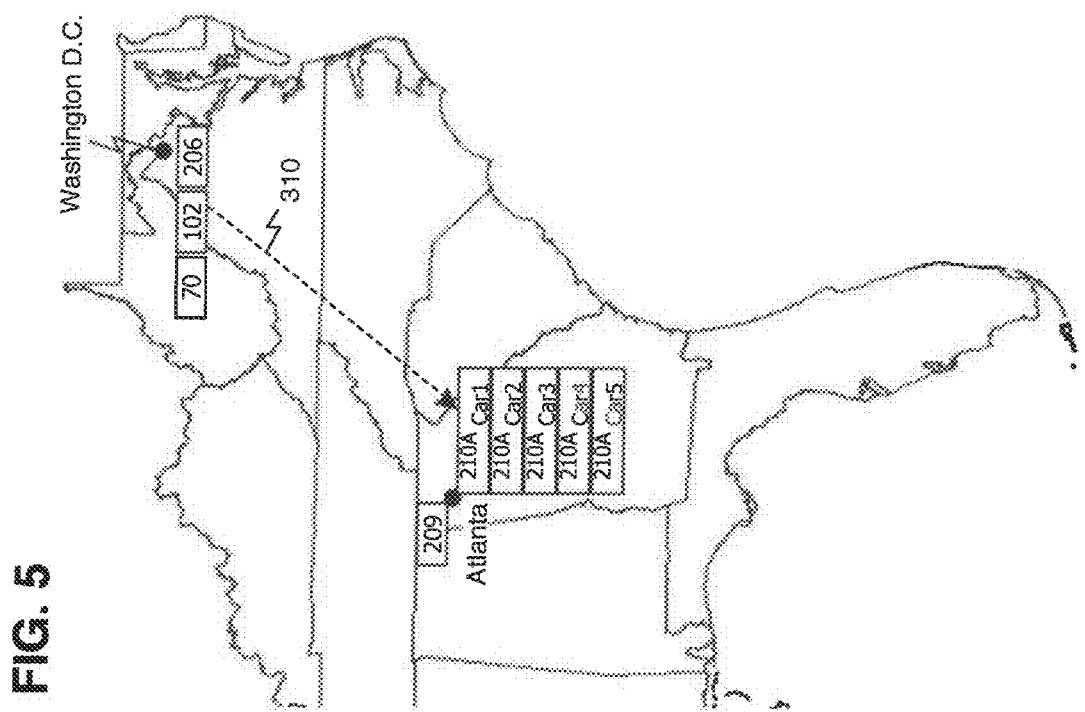
FIG. 5 illustrates an example map of plural geographical areas and gateways, which is useful in explaining example embodiments of the present disclosure.

The embodiments described herein disclose arrangements (e.g., systems, methods, logic) for intelligently structuring, handling and enhancing communication session handoffs between or among distinct networks, including differing carrier communication networks. The arrangements may be embodied in and performed by communication devices, call servers, routing engines and other devices, via hardware operations and/or software instructions executed by some or all such devices. The different types of networks contemplated herein include, for example, cellular mobile networks, public switched telephone networks (PSTN), data networks such as the Internet or other IP-based networks (including wide area networks, local area networks), alternative networks, and combinations thereof.

As used herein the term "communication session" is meant to generally indicate any one-way or two-way exchange of information between two or more communication devices. Communication sessions may include voice, data, video, and multimedia communication sessions, or any other type of data communication sessions or messaging exchanges. As used herein, the term "communication link" is intended to mean a physical or logical channel that connects two or more devices. In this context, a communication session may be established via one or more communication links. As non-limiting examples, a communication device may be: user equipment, a computer, a personal computer (PC), a desktop computer, a laptop computer, an ultrabook computer, a smartphone, a tablet computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof.

Reference will now be made in detail in various and alternative example embodiments and to the accompanying figures (FIGS.), in which like numerals represent substantially identical elements. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

In turning to a more detailed description, FIG. 1 illustrates an example networked environment (e.g., infrastructure) 100 for implementing certain example embodiments described herein. The networked environment 100 may include multiple distinct inter-connected networks such as, for instance, a large-scale internet protocol (IP) network (e.g., the Internet) 101, one or more IP based local area networks or wide area networks (LAN/WAN) 122, mobile carrier networks 110, PSTN 108 and alternative networks 115. Because these distinct networks utilize different protocols and signaling schemes, there are various interfaces (e.g., gateways) that allow for the seamless transition of voice and data (including text, audio, and video) such that various communication endpoints may communicate with one another over one or more of these inter-connected networks. For simplicity's sake, FIG. 1 depicts only one or only a few instances of each type of the aforementioned networks, but greater numbers of each or some of these networks can be used to implement a more scalable system.

Regarding more detailed descriptions of the networks, the PSTN 108 may be a circuit switched point-to-point communication network in which a physical connection between the endpoints is maintained for the duration of the connection. The PSTN 108 may also be referred to as the legacy telephone network as it is the backbone infrastructure for connecting endpoints including Plain Old Telephone Service (POTS) phones 116.

Mobile carrier networks 110 (sometimes referred to as cellular networks) may come in different varieties based on the radio transmission scheme 125 between a communication device known as a wireless handset (e.g., mobile or cellular phone) 114, 124 and the mobile carrier network base-station 112 that is in communication with the wireless handset 114, 124. Some (non-exhaustive) examples of such radio transmission schemes are the Global System for Mobile Communication (GSM), Long Term Evolution (LTE) and Code Division Multiple Access (CDMA). These radio transmission schemes are incompatible with one another necessitating an intervening interface to allow communication between endpoints on either network. Often, there may even be an intervening network such as the PSTN 108 between two distinct mobile carrier networks 110. As a result, each mobile carrier network 110 includes an interface to the PSTN 108 such that calls crossing that interface can be handled by the receiving network whether it is a mobile carrier network 110 or the PSTN 108.

Next, an IP based data network 122 like the Internet 101 may provide wireless connectivity to wireless handsets 124 within a range of an IP access point 120. For instance, an IP access point 120 may provide wireless connectivity using any of the 802.11 WiFi standards and/or any other type of IP based connectivity standard.

There may also be one or more alternative networks 115 that may provide access to the Internet 101 for a hybrid mobile device 124 or other wireless handset devices 114. One such alternative network 115 may be characterized as a WiMax network operable over the 802.16 wireless protocol standard, allowing the hybrid mobile device 124 to communicate with an IP access point 120 via a WiFi transmission scheme 123. Another such alternative network 115 may be characterized as a whitespace network. A whitespace network may utilize RF spectrum that is shared with television broadcasters, allowing the hybrid mobile device 124 to communicate with an alternative access point 111 via a whitespace transmission scheme 126. That is, unused RF spectrum may be tapped into to provide an alternative RF access point to an alternative network 115 that can interface with the Internet 101.

The collection of IP based data networks 122, 101 illustrated in FIG. 1, include, for example, the Internet, one or more intranets, wide area networks (WANs), local area networks (LANs), and the like, portions or all of which may be wireless and/or wired. All such IP based data networks run on a packet based data transfer protocol characterized as packet switching, and may be a wireless network or a portion of a wireless network. Packet switching essentially chops up a data stream (e.g., text, voice, data) into segments and transfers them across an IP network to a destination where the packets are re-assembled into the original data stream for output. Voice over IP (VoIP) is a specialized subset of IP packet based communication directed to IP telephony. A VoIP communication device 118 may communicate with an IP access point 120 to gain access to the larger IP network 101 and other communication devices. The FIG. 1 VoIP communication device 118 has been illustrated as a wireline type device, but may just as easily be a wireless device communicable with the IP access point 120 over, for instance, one or more of the 802.11 protocols.

The various networks 108 (PSTN), 110 (Mobile Carrier), 122, 101 (IP Based), etc., may interface with a call server 102 through interfaces (e.g., PSTN interface 104, VoIP interface 106, etc.), gateway devices, routers and/or other appropriate devices (not shown). The call server 102 may include a number of components (e.g., gateway module 102a, intelligence module 102b, call handoff module 102c) to aid in interfacing. That is, the call server 102 may execute various applications and/or other functionality for, among other things, setting-up, managing and tearing-down communication sessions between communication devices. The wireless handsets 114 may interface with the various networks 108 (PSTN), 110 (Mobile Carrier),122, 101 (IP based) and alternative networks 115 through appropriate access points 111, 120 (some not shown).

In addition to the call server 102, the networked environment (e.g., infrastructure) 100 may further include a master database 50 and a routing engine 70. The routing engine 70 may contain a routing engine database RE DB 72, and the call server 102 may contain a call server database CS DB 103. The routing engine database RE DB 72 and the call server database CS DB 103 may each be populated with a portion or a whole of the contents of the master database 50. The master database 50 may contain data compiled by one or more carrier to aid in operation decisions of their carrier network and/or subscriber communication sessions. Alternatively, each carrier (e.g., Carrier 3, Carrier 2, etc.) may compile their own master database. Although only a single master database 50, routing engine 70 and call server 102 are illustrated for simplicity, practice of embodiments is not limited thereto. That is, practice of embodiments may have any number of master databases 50, routing engines 70 and call servers 102, to implement a more scalable system.

The pair of the routing engine 70 and the call server 102 may cooperate together in the deciding of which gateway(s) to select to attempt an inter-network (e.g., inter-carrier) gateway handoff, for example.

The call server 102 may be maintained as an entity separate from the communication devices 114, 116, 118, 124, etc. and the various networks 101, 108, 110, 115, 122. Alternatively, the call server 102 may be maintained together with (e.g., as part of) any of the communication devices 114, 116, 118, 124, etc. and/or the various networks 101, 108, 110, 115, 122. Similarly, the routing engine 70 may be maintained as an entity separate from the call server 102. For example, the routing engine 70 may be maintained at a differing carrier facility (e.g., regional office, central office of a carrier). Alternatively, the routing engine 70 may be maintained together with (e.g., as part of) the call server 102, e.g., included as part of the gateway module 102a. Further, the master database(s) 50 may be maintained as a separate entity, or together with the routing engine(s) 70.

As a non-limiting example, embodiments described in this disclosure will assume that: the call server 102 and call server database CS DB 103 are embodied in a carrier service facility which is near-by (local) to an initiating (e.g., calling) communication device; the routing engine 70 and routing engine database RE DB 72 are embodied in a regional carrier service facility of the carrier; and the master database 50 is embodied in a centralized carrier service facility of the carrier.

Of relevance, each network service provider may provide equipment (communication devices) and service plans to its subscribers. These service plans can vary greatly in cost depending on the desired use of network resources. In addition, some service plans may bundle data and voice services in the cost of the service plan. Bundled voice and data services can place a significant burden on the mobile carrier network resources, so typically carriers impose use restrictions for bundled voice/data plans. Accordingly, each subscriber will have plan rules (e.g., permissions and prohibitions) associated with his/her telephone number, which define services that that particular subscriber may and may not be permitted to use according to their service plan.

In continuing the detailed description, FIG. 2 illustrates another example networked environment 200 for implementing certain example embodiments of the present disclosure. For simplicity's sake, FIG. 2 depicts only one or only a few instances of each type of components (e.g., routing engine 70, call server 102, communication devices 206, 209) for simplicity, but greater numbers of each or some of these components can be used to implement a more scalable system.

The FIG. 2 call server 102 may include, for example, a server computer or any other system having computing capability. The schematic block diagram shows that the call server 102 may include at least one processor 250, at least one communication interface 255 (e.g., a network interface card or the like), and a memory 260, each of which is coupled to a local interface 270. The local interface 270 may include, for example, at least one data bus with an accompanying address/control bus or other bus structure as can be appreciated. The memory 260 illustrated may be representative of a plurality of memories, as can be appreciated. Stored in the memory 260 are both data and several components (e.g., software applications) that are executable by the processor 250 and which help provide the functionality of the call server 102.

The call server 102 may include a cloud computing resource, a grid computing resource, and/or any other aggregated or distributed computing arrangement. Plural call servers 102 may be distributed among different geographical locations. Further, while the call server 102 is illustrated and described within this disclosure as including example components/functions, practice of the call server is not limited thereto. For example, the call server 102 may have fewer or greater components/functions. Further, where plural call servers 102 are provided, differing ones of the call servers 102 may have differing components/functions from one another, respectively.

In accordance with the present example embodiments, contact between the communication devices (terminals) 206, 209 is managed by the call server 135. That is, the call server 102 may execute various applications and/or other functionality (e.g., logic) for, among other things, setting-up, managing and tearing-down communication sessions between communication devices 206 and 209 and/or handoffs. A call server 135 can be a VoIP server or any other processor-driven device that is capable of executing instructions for establishing and/or managing call connections between terminals and for implementing the inventive inter-network (e.g., inter-carrier) gateway handoff as described herein. The call server 135 may also be an SMS server, an MMS server or any other processor-driven device that is capable of executing instructions for routing other contacts (other than calls) between terminals and for implementing the inventive gateway handoff as described herein.

As may be noticed during review of further portions of this disclosure, at some instances, a component may be described using a (generic) numeric reference number (e.g., widget 1) while the FIG. drawings may attach or append a further alphabetical or alphanumeric reference character to the numeric reference number (e.g., widget 1a, widget 1b). The alphabetical or alphanumeric-referenced component (unless stated otherwise) may mean a component similar to the numeric-referenced component but embodied within a specific illustrated entity of several illustrated entities. For example, while widget 1 might be described, an illustrated widget 1a might be embodied within a first illustrated entity, while widget 1b might be embodied within another illustrated entity. In short, widgets 1, 1a and 1b would be similar components, while the alphabetical portions a, b designate being embodied in differing illustrated entities.

In returning to FIG. 2, the applications and/or functional entities of the call server 102 may include, for example, a handoff service 215, a bridge service 216, multi-stream service 217, and other applications, services, processes, systems, engines, or functionality, including an operating system, not discussed in detail herein. The handoff service 215 may be executed to generate, collect and/or analyze intelligent communication session data 233 and to transmit intelligent communication session data 233 and/or handoff instructions to one or more communication device(s) 206 and 209. The handoff service 215 may generate intelligent communication session data 233 by monitoring and/or analyzing various aspects and qualities of communication sessions, either by itself or in conjunction with the bridge service 216 or other functionality of the call server 102. The handoff service 215 may receive intelligent communication session data 233 from communication devices 206, 209 or other network components. The handoff service 215 may also store the intelligent communication session data 233 in and retrieve it from the data store 214 and/or the call server database CS DB 103.

A call server 102 and routing engine 70 combination may, for example, work together to determine whether, when and where a communication session (e.g., voice call, multimedia call, message exchange, etc.) will or should be attempted to be handed-off between a plurality of networks 211, 212, and 213 accessible via any of a plurality of gateways 210A, 210B, 210C, . . . 210N. Handoffs may be made between networks of the same type (e.g., a first data network to a second data network or a first cellular network to a second cellular network, etc.) or between networks of different types (e.g., a data network to a cellular network, or vice versa, etc.).

The gateways 210A, 210B, 210C, . . . 210N may be geographically disbursed, respectively. As just a few non-limiting examples (see FIG. 3), a gateway(s) 210A may be in the Atlanta, Ga. area, a gateway(s) 210D may be in the Dallas, Tex. area, and a gateway(s) 210L may be in the Los Angeles, Calif. area. As will become more apparent in discussions to follow (see FIGS. 7-8), each of the various gateways 210A, 210B, 210C, . . . 210N may each include plural sub-gateways which may each belong to differing carriers (e.g., Carrier 1, Carrier 2, Carrier 3, Carrier 4, Carrier 5). For example, the Atlanta, Ga. area gateway(s) 210A may include plural sub-gateways (see FIG. 5, for example).

The bridge service 216 may be executed to establish and manage communication sessions between or among communication devices such as, for example, the communication device 206 operating as a caller device (hereinafter, sometimes referred to as caller device 206) and the communication device 209 operating as a recipient device (hereinafter, sometimes referred to as a recipient device 209). The bridge service 216 may be invoked by the call server 102 in response to receiving a request, e.g., from a caller device 206, to establish a communication session, e.g., with a recipient device 209. The bridge service 216 may be responsible for initiating bridges 219 to join together communication links between two or more communication devices 206, 209 and the call server 102. In this manner, the bridge 219 serves as a media relay between the caller device 206 and the recipient device 209 and/or other communication devices.

In the context of this disclosure, a "bridge" module or service may provide the service of joining together communication links between two or more communication devices and/or one communication device and the call server. In contrast, a "gateway" module or service may provide the service of joining together distinct networks (convert digital media streams between disparate types of telecommunications networks), and provide the service of receiving handoff requests from a requesting network, and deciding whether or not to permit/accept the handoff. For example, if a receiving network receiving a handoff request is near or at capacity, of if the receiving network does not have a working relationship with the requesting network, the receiving network may very well decline to permit/accept handoff. Declining may be effected via many differing ways, e.g., an explicit returned response back to the requesting network, or may be via ignoring the handoff request (i.e., letting the handoff request expire by timing out). On the other hand, should the gateway module or service decide to permit/accept handoff, the acceptance may be signaled, for example, via numerous acceptable approaches, e.g., an explicit returned response back to the requesting network.

In some embodiments, at least one of the example communication devices 206 and 209 may include hardware and software components for establishing communication sessions via at least two networks, such as two different networks or two similar networks based on different standards (e.g., a 3G vs. 4G cellular network 212, or a 2.5 GHz WiFi vs. a 5 GHz WiFi data network 212, etc.). For example, one or both of the communication devices 206 and 209 may include a cellular transceiver 223 and a Wi-Fi transceiver 226. The cellular transceiver 223 may be configured to receive and transmit data over a cellular network 211, for example. The Wi-Fi transceiver 226 may be configured to receive and transmit data over a data network 212, for example. Additionally, the devices 206 and 209 may include components (e.g., modem or network interface unit) configured to receive and transmit data over a PSTN 213, for example.

The communication devices 206 and 209 may further include memory 240 for storing software (e.g., operating system, applications, etc.) and data (e.g., intelligent communication session data 233, etc.). The communication devices 206 and 209 may be configured to execute various applications, such as a data communication application 227, a cellular communication application 228 and/or a handoff application 229. A data communication application 227 may provide functionality for enabling a Wi-Fi transceiver 226, for example, to communicate via a data network 212, and a cellular communication application 228 may provide functionality for enabling a cellular transceiver 223, for example, to communicate via a cellular network 211.

In differing embodiments, it may be unnecessary or undesirable to execute the handoff service 215 and/or the bridge service 216 at the call server 102. Instead, one or all of these services may be executed by other network devices (e.g., in the cloud) or may be executed locally by one or more communication device(s) 206, 209. In cases where the handoff service 215 and/or the bridge service 216 are executed in the cloud, the communication devices 206, 209 may interact with those services to receive intelligent communication session data 233, handoff instructions, multi-streaming instructions and/or call bridging services. In cases where the handoff service 215 is executed locally on a communication device 206, 209, those services may interact with, or may replace, the handoff application 229 in order to perform the intelligent handoff described herein. Executing the bridge service 216 locally on a communication device 206, 209 will allow that device to provide call bridging services to other communication devices.

An example general description of the operation of the various components of the example FIG. 2 networked environment 200 is as follows, although practice of embodiments is not limited thereto. To begin, a user of the caller device 206 may wish to initiate a voice call and/or other communication session with another user of another communication device, such as the recipient device 209. By way of example, the caller device 206 may identify and connect to an accessible data network 212a, which may be an IP-based network, to initiate a communication session. In some cases, the caller device 206 may be configured to interact with the resources of the data network 212a, which in turn interact with the call server 102 to establish a communication link between the caller device 206 and the call server 102. The call server 102 then establishes a communication link with the recipient device 209.

As described, in some embodiments the FIG. 2 bridge service 216 may be invoked to create and manage a bridge 219 for the communication session. The bridge service 216 may receive or determine identifying information related to the communication session, such as a unique identifier of the caller device 206 (e.g., a caller telephone number) and a unique identifier of the recipient device 209 (e.g., a recipient telephone number). The bridge service 216 associates the communication session with it the identifying information, shown in the figure as the caller device ID 220 and the recipient device ID 221. Other unique identifiers may be used to identify the communication session in other embodiments.

As mentioned previously, many outgoing communication sessions are eventually interfaced (e.g., routed through and handed-off) at a gateway to allow for communication from distinct network to another. This disclosure is directed to providing more efficient gateway routing and handoffs of outgoing communication requests between distinct networks, e.g., from one carrier's network to another. Described herein are methods, systems, programs and techniques for intelligently enhancing network handoff decisions and operations, thereby resulting in improved efficiency for both the carrier and the subscriber. While the handoff module 215 (FIG. 2) handles the mechanics of issuing a handoff request to a gateway and conducting an actual handoff operation, it will be assumed for simplicity sakes that the routing engine 70 and call server 102 are the entities cooperating together and responsible for determining one or more gateway candidate to which the handoff module 215 should make a gateway handoff request.

Discussions turn next to several non-exhaustive, non-limiting specific examples which may assist in a further understanding of example operations of gateway handoff.

In the FIG. 3 example, only four (4) geographical areas (Atlanta, Ga.; Dallas, Tex., Los Angeles, Calif.; and, Washington, D.C.) of the United States will be discussed for the sake of simplicity. However, practice of embodiments is by no means limited to only four (4) geographical areas, given that an actual telecommunications infrastructure spans much of the earth. Further in the FIG. 3 example, it is assumed for the sake of simplicity that both the calling device 206 and the called device 209 are phones, and that the communication session attempted is a voice call. However, practice of embodiments is by no means limited to only phones or to voice calls, and in practice there may be many differing types of devices (e.g., computers, laptops, tablets, etc.) attempting any of many differing types of communication sessions (e.g., a text message as specified by the well known Short Messaging Service (SMS), a multimedia message as specified by the well known Multimedia Messaging Service (MMS), and other types of non-voice communications that would be known to those skilled in the art).

Within the FIG. 3 example, a calling communication device 206 located, for example, within the Washington, D.C. area attempts (with the assistance of the routing engine 70 and call server 102) a call to a called communication device 209 located, for example, within the Atlanta, Ga. area. That is, the routing engine and/or the call server 102 may determine the identity of the recipient device 209 from data included in the request. For instance, the data included in the request may include a unique phone number, user name, interne protocol (IP) address, and/or other identification associated with the recipient device 209. As non-limiting examples, the routing engine 70 and/or the call server 102 may determine that the called communication device 209 is located within the Atlanta, Ga. area, by analyzing at least a part of a called telephone number and/or accessing information about a present location of the called telephone number from an available database(s).

More particularly, in such determination, there is one aspect that each network (e.g, PSTN 108, VoIP 101, 122 and mobile carrier 110) has in common that facilitates communication sessions among communication devices native to the various networks and carriers. The commonality is that each communication device has a unique telephone number (TN) as an identifier. The format of the telephone number is identical regardless of the network or carrier in use. In North America, for instance, the TN is a ten-digit number. Each communication device in North America is associated with a 10-digit telephone number that subscribers 'dial' to reach other subscribers no matter the network or carrier the other subscriber uses.

Portions of the 10-digit telephone number may provide a clue as to a geographical location of the communication device. That is, a 3-digit area code portion may designate the geographical area where the communication device was first put into service. For example, a "202" area code designates the Washington, D.C. area, a "404" area code designates the Atlanta, Georgia area. However, given telephone number portability and given the high degree of mobility of many subscribers, the 3-digit area code is no guarantee of where a communication device is located at a current (real) time. As an alternative device-locating scheme, the telecommunications infrastructure and/or carrier networks may maintain information which cross-references telephone numbers to current (real-time) locations of communication devices, and such information may be accessible to carriers to assist in the determination of the current location of devices.

Next, FIG. 4 illustrates a portion of an example database or table 400 containing intelligent gateway data. As non-limiting examples, the database 400 may contain: a column 410 containing data pertaining to a "Call To" area of the call (i.e., where the called device is located; e.g., Atlanta, Atlanta, . . . ); a column 420 containing "G-W Locat." data as to a location of each gateway candidate (e.g., Atlanta, Dallas, . . . ); a column 430 containing "G-W ID" data as to the identification of a gateway ID (e.g., 210A, 210D, . . . ); a column 440 containing "IP Address" data as to an Internet protocol (IP) address (e.g., 67.231.13.135, 96.44.189.107, . . . ) of the gateway; a column 450 containing "Dist." data as to an estimated distance (e.g., 639 miles, 2109 miles, . . . ) that a handed-off call would travel from the call server 102 to the region where the called telephone exists if that gateway were to be used for handoff; and, a column 460 containing "#H-Offs" data as to a total number of gateway handoffs (e.g., "1", "2", . . . ) expected to be encountered by the call if that gateway were to be used for handoff.

While the FIG. 4 database (and other example databases) within this disclosure include example data within the individual cells, such example data are fictional and meant only for illustrative and/or discussion purposes and not meant to be accurate. For example, while example IP addresses are given, such IP addresses are not accurate in real-life. Further, while some performance data, costs, etc., regarding various gateways and/or carriers may be given, such data, costs, etc., are fictional and in no way meant to be accurate or to suggest that one carrier is superior or recommended over another.

The FIG. 4 data may represent just a portion of master database 50. Regarding overall contents, the master database 50 may contain all data pertaining to all locations from which a call might be initiated from or called to. As a simplistic example using only the aforementioned FIG. 3 Atlanta, Dallas, Los Angeles and Washington, D.C. locations, the master database 50 may have a number of portions and subdivisions dedicated to calling and called locations. That is, the master database may have four "calling from" portions, e.g., "calling from Atlanta", "calling from Dallas", "calling from Los Angeles" and "calling from Washington, D.C.". Each "calling from" portion may in turn, have a separate "Call To" subdivision directed to each of the other geographical locations. For example, a "calling from Atlanta" portion may have the three "Call To" subdivisions of: "Call To Dallas", "Call to Los Angeles" and "Call to Washington, D.C.". Similarly, a "calling from Dallas" portion of the master database 50 might have the three "Call To Atlanta", "Call To Los Angeles" and "Call To Washington, D.C." subdivisions.

Within the master database 50, the "calling from" Atlanta, Dallas, Los Angeles, Washington D.C., portions might each be stored within separate folders of the master database 50, or the database might have another "Calling From" column populated with the calling from locations (see FIG. 8 "Call Fr" column 805 for an example).

In returning to FIG. 4, it should be apparent that the FIG. 4 table illustrates only a "calling from Washington, D.C." portion, and in particular, only a "Call To" Atlanta subdivision thereof. Further, although three (3) example rows of data pertaining to the "Atlanta Area" as the "Call To" location are shown in FIG. 4, in practice the database or table 400 may contain any number of rows of data, with un-shown rows being represented within the FIG. by the dotted "•••" rows. That is, un-shown rows may, for example, contain data pertaining to other areas (e.g., Anaheim, Calif. area, Boston area, etc.) as the "Call To" location. In reality, there may be thousands or millions of rows, accommodating data as to a multitude of real-life "Call To" locations spanning the planet.

As to storage logistics, given that a Washington, D.C. located routing engine 70 and/or the calling server 102 might (in its operations) only utilize a "calling from" Washington, D.C. portion of the master database 50, it might be recommended that the routing engine database RE DB 72 and/or the calling server database CS DB 103 only store the "calling from" Washington, D.C. portion of the master database 50. Such would allow smaller memory space to be used resulting in economies of scale and cost. If the routing engine 70 services more "calling from" locations than just Washington, D.C., such routing engine database RE DB 72 may store a greater portion of the master database 50. For example, if the routing engine 70 services all mid-Atlantic "calling from" locations, then the RE DB 72 may store all portions of the master database 50 which pertain to all mid-Atlantic "calling from" locations.

In turning to use of the data, in a less-intelligent approach, the routing engine 70 may simply use a round-robin methodology to direct sequential handover requests to a select number of gateways, such as shown representatively in FIG. 4 via round-robin sequence 470. That is, if the routing engine 70's round-robin sequence 470 had last attempted to handoff to a Dallas area gateway, then for a next attempt the sequence would try handoff to the Los Angeles area gateway, then Atlanta, then back to Dallas, and repeat through such pattern. Such non-intelligent approach might be good for load balancing, but may not be efficient in that (depending on timing or luck in the sequence) handoff might be made to a gateway which is not close and/or saddled with a lot of latency. For example, in the present Washington, D.C. call example which is calling an Atlanta area phone, the handoff request might be made to, and accepted by, the Los Angeles gateway. In short, unnecessary distance and/or latency would be added to the call, due to the need to backhaul the call first to Los Angeles, and then back from Los Angeles to Atlanta.

In a more efficient embodiment, the routing engine 70 makes more intelligent use of the intelligent gateway data within the example database or table 400. For example, the routing engine 70, in knowing that the called communication device is in the Atlanta area, might access and compare the distance data of all gateway candidates listing within the "Call To Atlanta" subdivision to pick a single gateway. For example, given that the call distance (639 miles; FIG. 3 path 310) using the Atlanta gateway 210A is significantly shorter than the call distance (2109 miles; path 320+path 330) using the Dallas gateway 210D or the distance (4842 miles; path 340+path 350+path 330) using the Los Angeles gateway 210L, the routing engine 70 may pick the Atlanta gateway 210 to request a handoff. The routing engine 70 may convey the determined gateway to the call server 102 by, for example, sending the gateway's IP address (e.g., 67.231.13.135) as taken from FIG. 4's column 440.

Given that there is no guarantee that the Atlanta gateway 210 will accept the handoff request, picking only a single gateway may not be prudent. Accordingly, the call server may in another embodiment, pick at least a sub-plurality of the gateways from the database and arrange the sub-plurality in a hierarchy of the order in which hand-off gateways are instructed to be attempted, e.g., gateway with the shortest distance attempted first. For example, the routing engine 70 might pick both the Atlanta gateway 210A (639 miles) and the Dallas gateway 210D (2109 miles) and instruct the call server 102 (e.g., via an outputted hierarchy list) that handoff should be attempted to the Atlanta gateway 210A first, and then to the Dallas gateway 210D should the Atlanta gateway not accept the handoff request. In this example, the routing engine 70 may send the plural gateways IP addresses (e.g., 67.231.13.135; 96.44.189.107) to the call server 102, in the order the gateway handoffs should be attempted. Although two gateways are described with respect to this example embodiment, practice of the embodiment is in no way limited to just a two gateway selection, e.g., any number of gateways may be selected and arranged within an instruction hierarchy.

A differing parameter which the routing engine 70 might look at regarding improving handoff efficiency might be a number of gateways expected to be encountered by a call if handed-off to each gateway candidate. More particularly, an initial gateway handed off to might need to subsequently handoff the call itself. For example, a Los Angeles gateway does not itself service communication devices located in the Atlanta area, so the Los Angeles gateway may subsequently handoff the call to the Dalles gateway or the Atlanta gateway. As a result, a number of gateway handoffs may be encountered by a connecting call. In an embodiment, the routing engine 70 might look at and compare the data within the FIG. 4 "# of Gateway Handoffs" column 460 for all gateway candidates for the "Call To Atlanta" subdivision to pick a single gateway. For example, given that the # of gateway handoffs ("1") expected to be encountered using the Atlanta gateway 210A is at least half of the # of gateway handoffs ("2") using the Dallas gateway 210D or the # of gateway handoffs ("2-3") using the Los Angeles gateway 210L, the routing engine 70 may pick the Atlanta gateway 210 to attempt handoff. The routing engine 70 may convey the determined gateway to the call server 102 by, for example, sending the gateway's IP address (e.g., 67.231.13.135) from FIG. 4's column 440.

Again, in another embodiment, the call server may pick at least a sub-plurality of the gateways from the database and arrange the sub-plurality in a hierarchy per # of gateway handoffs. For example, the call server might pick both the Atlanta gateway 210A ("1" handoff) and the Dallas gateway 210D ("2" handoffs) and instruct (e.g., via an outputted hierarchy list) that handoff should be attempted to the Atlanta gateway 210A first, and then to the Dallas gateway 210D should the Atlanta gateway not accept the handoff request. In this example, the routing engine 70 may send the plural gateways IP addresses (e.g., 67.231.13.135; 96.44.189.107) to the call server 102, in the order the gateway handoffs should be attempted. Although two gateways are described with respect to this example embodiment, practice of the embodiment is in no way limited to just a two-gateway selection, e.g., any number of gateways may be selected and arranged within the instruction hierarchy.

While the above example embodiments concern selection of a geographical gateway for handoff, another embodiment may concern selection of a carrier gateway. Explanations is as follows. In the above "calling from Washington, D.C." and "Call To Atlanta" examples, the most efficient gateway to handoff to was an Atlanta-located gateway. In reality, there would be a number of Atlanta-located gateways (not just one) which could be handed-off to. That is, FIG. 5 illustrates an example situation showing five (5) gateways, for example: a Carrier 1-owned gateway $210A_{CAR1}$; a Carrier 2-owned gateway $210A_{CAR2}$; a Carrier 3-owned gateway $210A_{CAR3}$; a Carrier 4-owned gateway $210A_{CAR4}$ and a Carrier 5-owned gateway $210A_{CAR5}$. Practice of embodiments is by no means limited to just five (5) gateways.

Accordingly, a decision must be made as to which singular Atlanta-located gateway handoff should be attempted to, or to which plural Atlanta-located gateways and what order of priority that handoff should be attempted to. In the present example, it is assumed that the routing engine 70 is making such decision, and sending its decision to the call server 102. However, practice of embodiments is not limited thereto.

FIG. 6 illustrates a portion of an example database or table 600 containing intelligent gateway data useable in conjunction with the FIG. 5 example. As non-limiting examples, the database 600 may contain: a column 610 containing data pertaining to a "Call To" area (e.g., Atlanta) of the call (i.e., where the called device is located); a column 620 containing "G-W Locat." data as to a location of each gateway candidate (e.g., Atlanta, . . . ); a column 630 containing "G-W ID" data as to the identification of a gateway ID (e.g., $210A_1$, $210A_6$, . . . ); a column 640 containing "IP Address" data as to an Internet protocol (IP) address (e.g., 67.231.13.135, 67.231.1.99, . . . ) of the gateway; a column 650 containing "Dist." data as to an estimated distance (e.g., 639 miles, 642 miles, . . . ) that a handed-off call would travel from the call server 102 to the region where the called telephone exists if that gateway were to be used for handoff; a column 660 containing "Latency" data as to an expected (e.g., average) latency (e.g., 200 mS, 210 mS, . . . ) that a handed-off call would encounter before receiving a response from a handoff request sent to the gateway; a column 670 containing "Quality" data (e.g., 8, 9, . . . ) as to a (e.g., average) quality level (e.g., on a scale of 10) experienced in the past in using the gateway; a column 680 containing "Carrier" data (e.g., Carrier 1, Carrier 2, . . . ) as to the carrier owner of the gateway; a column 690 containing "Cost" data (e.g., 0.015/in, 0.020/min) as to a cost to use the gateway per minute; and a column 695 containing "Capacity" data (e.g., 70%, 90%, . . . ) as to a currently-used capacity of the carrier network associated with the gateway.

As can be best understood from FIG. 6's "Dist." column 650, call distance might not be the best parameter to look at for judging handoff requests for plural gateways within a same general location. For example, the FIG. 5 five (5) gateways would have approximately the same call distances (e.g., approximately 640 miles). In contrast, the gateways might have vastly differing latency or other values (e.g., cost) associated therewith. For example, a call distance using a PSTN network might have significantly higher latency whereas the same call distance using an IP network might have significantly lower latency by using fiber optic cabling, for example. In short, latency may be a better parameter to look at for deciding handoff requests.

In an embodiment, the routing engine 70 might look at and compare the data within the FIG. 6 "Latency" column 660 for all gateway candidates for the "Call To Atlanta" subdivision to pick a single gateway. For example, given that the latency (190 mS) expected to be encountered using the Carrier 4 gateway $210A_{10}$ is the lowest, the routing engine 70 may pick the Carrier 4 gateway $210A_{10}$ to attempt handoff. The routing engine 70 may convey the determined gateway to the call server 102 by, for example, sending the gateway's IP address (e.g., 67.231.1.57) as taken from FIG. 6's column 640.

Again, in another embodiment, the routing engine 70 may pick at least a sub-plurality of the gateways from the database and arrange the sub-plurality in a hierarchy per shortest-to-longest latency. For example, the call server might pick both the Carrier 4 gateway $210A_{10}$ (190mS) and the Carrier 1 gateway $210A_1$ (200 mS) and instruct (e.g., via an outputted hierarchy list) that handoff should be attempted to the Carrier 4 gateway $210A_{10}$ first, and then to the Carrier 1 gateway $210A_1$ should the Carrier 4 gateway $210A_{10}$ not accept the handoff request. In this example, the routing engine 70 may send the plural gateways IP addresses (e.g., 67.231.1.57; 67.231.13.135) to the call server 102, in the order the gateway handoffs should be attempted. Although two gateways are described with respect to this example embodiment, practice of the embodiment is in no way limited to just a two-gateway selection, e.g., any number of gateways may be selected and arranged within the instruction hierarchy.

As a differing deciding parameter, the routing engine 70 might look at and compare the data within the FIG. 6 "Quality" column 670 for all gateway candidates for the "Call To Atlanta" subdivision to pick a single gateway. For example, given that the quality ("10") expected to be encountered using the Carrier 4 gateway $210A_{10}$ is the highest, the routing engine 70 may pick the Carrier 4 gateway $210A_{10}$ to attempt handoff. The routing engine 70 may convey the determined gateway to the call server 102 by, for example, sending the gateway's IP address (e.g., 67.231.1.57) as taken from FIG. 6's column 640.

Again, in another embodiment, the routing engine 70 may pick at least a sub-plurality of the gateways from the database and arrange the sub-plurality in a hierarchy per highest-to-lowest quality. For example, the call server might pick a group including the Carrier 4 gateway $210A_{10}$ ("10"), Carrier 2 gateway $210A_6$ ("9"), Carrier 3 gateway $210A_8$ ("9") and Carrier 5 gateway $210A_{11}$ ("9"), and instruct (e.g., via an outputted hierarchy list) that handoff should be attempted to a next gateway in the list should a previously-tried gateway not accept the handoff request. In this example, the routing engine 70 may send the plural gateways IP addresses (e.g., 67.231.1.57; 67.231.1.99; 192.168.16.124; 67.231.1.52) to the call server 102, in the order the gateway handoffs should be attempted. Although four gateways are described with respect to this example embodiment, practice of the embodiment is in no way limited to just a four-gateway selection, e.g., any number of gateways may be selected and arranged within the instruction hierarchy.

As another differing deciding parameter, the routing engine 70 might look at and compare the data within the FIG. 6 "Carrier" column 680 for all gateway candidates for the "Call To Atlanta" subdivision to pick a single gateway. As one example, the carrier handing off the call may have a business partnership with another carrier (e.g., Carrier 5) and may be obligated or may simply prefer to attempt handoff to such business partner. The routing engine 70 may convey the determined gateway to the call server 102 by, for example, sending the gateway's IP address (e.g., 67.231.1.52) as taken from FIG. 6's column 640.

As a further parameter, the routing engine 70 might look at and compare the data within the FIG. 6 "Cost" column 690 for all gateway candidates for the "Call To Atlanta" subdivision to pick a single gateway. For example, given that the cost (0.015/min) expected to be encountered using the Carrier 1 gateway $210A_1$ is the lowest, the routing engine 70 may pick the Carrier 1 gateway $210A_1$ to attempt handoff. The routing engine 70 may convey the determined gateway to the call server 102 by, for example, sending the gateway's IP address (e.g., 67.231.13.135) as taken from FIG. 6's column 640.

Again, in another embodiment, the routing engine 70 may pick at least a sub-plurality of the gateways from the database and arrange the sub-plurality in a hierarchy per lowest-to-highest cost. For example, the call server might pick both the Carrier 1 gateway $210A_1$ (0.015/min) and Carrier 4 gateway $210A_{10}$ (0.017/min) and instruct (e.g., via an outputted hierarchy list) that handoff should be attempted to the Carrier 1 gateway $210A_1$ first, and then to the Carrier 4 gateway $210A_{10}$ should the Carrier 1 gateway $210A_1$ not accept the handoff request. In this example, the routing engine 70 may send the plural gateways IP addresses (e.g., 67.231.13.135; 67.231.1.57) to the call server 102, in the order the gateway handoffs should be attempted. Although two gateways are described with respect to this example embodiment, practice of the embodiment is in no way limited to just a two-gateway selection, e.g., any number of gateways may be selected and arranged within the instruction hierarchy.

As a final FIG. 6 parameter, the routing engine 70 might look at and compare the data within the FIG. 6 "Capacity" column 695 for all gateway candidates for the "Call To Atlanta" subdivision to pick a single gateway. For example, given the low percentage capacity (70%) currently being used in the Carrier 1 gateway $210A_1$, the routing engine 70 may pick the Carrier 1 gateway $210A_1$ to attempt handoff. That is, the routing engine 70 may assume that the Carrier 1 gateway is the most likely to accept a handoff request since the Carrier 1 gateway has the most unused capacity. The routing engine 70 may convey the determined gateway to the call server 102 by, for example, sending the gateway's IP address (e.g., 67.231.13.135) as taken from FIG. 6's column 640.

Again, in another embodiment, the routing engine 70 may pick at least a sub-plurality of the gateways from the database and arrange the sub-plurality in a hierarchy per most-unused-to-most-used capacity. For example, the call server might pick a group including the Carrier 1 gateway $210A_1$ ("70%"), Carrier 4 gateway $210A_{10}$ ("77%") and Carrier 5 gateway $210A_{11}$ ("81%") and instruct (e.g., via an outputted hierarchy list) that handoff should be attempted to a next gateway in the list should a previously-tried gateway not accept the handoff request. In this example, the routing engine 70 may send the plural gateways IP addresses (e.g., 67.231.13.135; 67.231.1.57; 67.231.1.52) to the call server 102, in the hierarchy order the gateway handoffs should be attempted. Although three gateways are described with respect to this example embodiment, practice of the embodiment is in no way limited to just a three-gateway selection, e.g., any number of gateways may be selected and arranged within the hierarchy order.

In the above example embodiments, only a single parameter was being looked at at a given time to determine a gateway(s) to which handoff should be attempted. However, practice of embodiments is not limited to looking at a single parameter. More particularly, in a differing embodiment, the routing engine 70 may look at plural parameters in making a decision. In one embodiment, a formula may be used or weightings may be assigned to the various parameters. For example, "Cost" may be weighted as influencing 80% of the decision, whereas "Latency" may be weighted as influencing 20% of the decision. Any other multi-parameter approach may be used. Further, differing and/or additional parameters beyond those listed within the disclosure examples may be used.

In a next example to be discussed, a call will be taken as being made from a Raleigh, N.C. (919) telephone number to a Pittsburgh, Pa. (412) telephone number. In the example, it is assumed that the routing engine 70 selects a hierarchy of eight gateways to which handoff should be attempted. As previously mentioned, the routing engine 70 may return a listing of IP addresses for the gateways selected, back to the call server 102. In an example embodiment, the instruction and IP address hierarchy list outputted by the routing engine 70 may be conveyed via a Session Initiation Protocol (SIP) message. One example SIP message may be as follows. Some parts of the message were removed and/or not included for clarity and simplicity:

SIP Example 1

```
SIP/2.0 300 Multiple choices
CSeq: 555355 INVITE
Call-ID: 1243657567_119355492@192.168.23.11
From: <sip:+19195551212@192.168.23.11>;tag=gK006259ad
To: <sip:+14128560600@192.168.3.88>
Via: SIP/2.0/UDP
192.168.3.88;branch=z9hG4bKf38d.662eddc6.0,SIP/2.0/UDP
192.168.23.11:5060;branch=z9hG4bK00B80126aea5dfd33b0
    Contact:
<sip:+14128560600;npdi;rn=+14126680976@67.231.13.135:5060;transport=udp
>;q=0.99
    Contact: <sip:+14128560600@67.231.1.57:5060;transport=udp>;q=0.98
    Contact: <sip:+14128560600@67.231.1.52:5060;transport=udp>;q=0.97
    Contact: <sip:+14128560600@67.231.1.99:5060;transport=udp>;q=0.96
    Contact:
<sip:+14128560600@192.168.16.124:5060;transport=udp>;q=0.95
    Contact:
<sip:+14128560600;npdi;rn=+14126680976@67.231.5.175:5060;transport=udp>
;q=0.94
    Contact: <sip:+14128560600@67.231.9.57:5060;transport=udp>;q=0.93
    Contact: <sip:+14128560600@67.231.9.52:5060;transport=udp>;q=0.92
```

Within the above SIP message, "+19195551212" is the calling telephone number, and "192.168.23.11" is the IP address of the communication device used to make the call. Further, "+14128560600" is the called telephone number. The eight (8) "Contact:" lines represent the list of IP addresses (e.g., "67.231.13.135", "67.231.1.57", . . . ) of gateways to attempt handoff to.

The eight IP addresses are arranged in a hierarchy within the SIP message, by using decrementing SIP "q" values. More particularly, the call server 102, in receiving the above SIP message, would contain logic to know to first attempt handoff to the IP address in the "Contact" instruction having a highest "q=0.99" value, i.e., would attempt handoff to a gateway having the instructed IP address of "67.231.13.135". If the handoff was unsuccessful (e.g., via a returned decline message or via timing out), the logic of the call server 102 would next attempt handoff to the IP address in the "Contact" instruction having a next lower "q=0.98" value, i.e., would attempt handoff to a gateway having the instructed IP address of "67.231.1.57". In general, upon an unsuccessful handoff attempt, the logic of the call server 102, would next attempt handoff to the IP address in the "Contact" instruction having a sequentially lower "q" value than the unsuccessful handoff attempt, i.e., "q=0.97", then "q=0.96", . . . all the way (if necessary) to "q=0.92". In short, if handoff-attempt-to-handoff-attempt were unsuccessful, the call server would make eight attempts at handoff with the above SIP message example, proceeding sequentially along the "Contact" instructions from the highest-to-lowest "q" value. In contrast, if one of the handoff attempts was successful, the logic of the call server would stop further handoff attempts such that fewer than eight attempts would be made.

In the above embodiment, the routing engine 70 essentially makes all carrier and gateway decisions, i.e., the call server does not make carrier or gateway decisions, and instead just follows the decisions of the routing engine via the IP addresses provided. In a differing embodiment, labeling (instead of IP addresses) may be utilized to reduce a SIP message size/content, and to allow the call server 102 to also contribute to making gateway decisions. FIGS. 7-8 will be utilized to describe such embodiment.

The FIG. 7 example's focus is on carrier (as opposed to geographical) selection, and accordingly, for simplicity only two (2) geographical areas (Raleigh, N.C. (NC) and Pittsburgh, Pa. (PA)) of the United States will be illustrated and discussed. However, practice of embodiments is by no means limited to only two (2) geographical areas, given that an actual telecommunications infrastructure spans much of the earth. Further in the FIG. 7 example, for the sake of simplicity it is assumed that both the calling device 206 and the called device 209 are phones, and that the communication session attempted is a voice call. However, practice of embodiments is by no means limited to only phones or to voice calls, and in practice there may be many differing types of devices (e.g., computers, laptops, tablets, etc.) attempting any of many differing types of communication sessions. Further aspects of FIG. 7 will be discussed ahead.

FIG. 8 illustrates a portion of an example database or table 800 containing intelligent gateway data useable in conjunction with the FIG. 7 example. As non-limiting examples, the database 800 may contain: a column 805 containing data pertaining to a "Call Fr" area of the call (i.e., where the calling device is located when it initiates the call (e.g., Raleigh)); column 810 containing data pertaining to a "Call To" area of the call (i.e., where the called device is located (e.g., Pittsburgh)); a column 820 containing "G-W Locat." data as to a location of each gateway candidate (e.g., Pittsburgh, . . . ); a column 830 containing "G-W ID" data as to the identification of a gateway ID (e.g., 210P$_1$, 210P$_2$, . . . ); a column 840 containing "IP Address" data as to an Internet protocol (IP) address of the gateway (e.g., 216.231.13.135, 216.231.13.136, . . . ); a column 850 containing "Dist." data as to an estimated distance (e.g., 329 miles, 329 miles, . . . ) that a handed-off call would travel from the call server 102 to the region where the called telephone exists if that gateway were to be used for handoff; a column 860 containing "Latency" data as to an expected (e.g., average) latency (e.g., 200 mS, 210 mS, . . . ) that a handed-off call would encounter before receiving a response from a handoff request sent to the gateway; a column 870 containing "Quality" data (e.g., 8, 8, . . . ) as to a (e.g., average) quality level (e.g., on a scale of 10) experienced in the past in using the gateway; a column 880 containing "Carrier" data (e.g., Carrier 1, Carrier 1, . . . ) as to the carrier owner of the gateway; a column 890 containing "Cost" data (e.g., 0.015/min, 0.015/min, . . . ) as to a cost to use the gateway per minute; and a column 895 containing "Capacity" data (e.g., 70%, 78%, . . . ) as to a currently-used capacity of the carrier network associated with the gateway. In this example embodiment, the FIG. 8 data would be stored in both the FIG. 7 routing engine database 72' and the call server database 103'. Alternatively, the routing engine 70' and call server 102' may share a common database.

In this embodiment, the FIG. 7 routing engine 70' essentially makes carrier decisions, and some gateway decisions. More particularly, as can be seen from FIG. 7's left-most column and FIG. 8's column 880, seven (7) carriers (i.e., Carrier 1; Carrier 2; Carrier 3; Carrier 4; Carrier 5; Carrier 6; Carrier 7) own gateways in the Pittsburgh area. It this example, it is assumed that the routing engine 70' selects a hierarchy of only five (5) carriers (i.e., Carrier 1; Carrier 2; Carrier 3; Carrier 4; Carrier 5) to which handoff should be attempted. Such selection may be based upon any desired criteria. As one example, it will be assumed that the routing engine 70' has ignored any carrier gateways having a "Cost" of $0.025/min or higher. Such cost limitation may be due, for example, to calling plan permissions of the calling subscriber, i.e., the calling plan permissions might have indicated that use of carrier gateways having a "Cost" of $0.025/min or higher is not permitted with this subscriber's plan.

In past embodiment examples, the routing engine returned a listing of IP addresses for the gateways selected. In contrast, with this embodiment, the routing engine 70' may use labeling within the SIP message. While carrier labeling will be used, practice of embodiments is not limited to using carrier labeling, and instead any type of labeling may be used. Again, the instruction and a carrier hierarchy list may be outputted by the routing engine 70' via a Session Initiation Protocol (SIP) message, which is sent to the call server 102'. One example SIP message may be as follows. Some parts of the message were removed and/or not included for clarity and simplicity. Further, SIP portions of heightened interest have been bolded and underlined:

SIP Example 2:

```
SIP/2.0 300 Multiple choices
    CSeq: 555355 INVITE
    Call-ID: 1243657567_119355492@192.168.23.11
    From: <sip:+19195551212@192.168.23.11>;tag=gK006259ad
    To: <sip:+14128560600@192.168.3.88>
    Via: SIP/2.0/UDP
192.168.3.88;branch=z9hG4bKf38d.662eddc6.0,SIP/2.0/UDP
192.168.23.11:5060;branch=z9hG4bK00B80126aea5dfd33b0
    Contact:
<sip:+14128560600;npdi;rn=+14126680976@CARRIER1:5060;transport=udp>;q=0
.99;failover=all
    Contact:
<sip:+14128560600@CARRIER4:5060;transport=udp>;q=0.98;failover=0
```

```
      Contact:
<sip:+14128560600@CARRIER5:5060;transport=udp>;q=0.97;failover=0
      Contact:
<sip:+14128560600@CARRIER2:5060;transport=udp>;q=0.96;failover=0
      Contact:
<sip:+14128560600@CARRIER3:5060;transport=udp>;q=0.95;failover=0
        Content-Length: 0
```

In comparing this SIP Example 2 message with the prior SIP Example 1, instead of providing IP addresses of gateways, the routing engine 70' has instead substituted carrier labels (e.g., "Carrier 1", "Carrier 4", . . . ) in place thereof. As a result, the call server 102' may now have additional logic which will allow it to recognize the carrier labeling within a received SIP message, and to resolve each carrier label into one or more gateway IP address. Such is advantageous in that part of the burden/workload which was previously mainly on the routing engine in prior example embodiments, has now been shifted over to (i.e., shared with) the call server 102'.

In the discussions to follow, it is initially assumed (for simplicity) that each carrier label must be resolved into only one gateway IP address.

In a simple example where a carrier has only one available gateway in the "Call To" location, the resolving of the carrier label into a gateway IP address is straightforward. For example, since the FIG. 8 data shows that Carrier 4 and Carrier 5 each only own one Pittsburg gateway (i.e., gateway 210P$_{10}$ and 210P$_{11}$, respectively), the "Carrier 4" and "Carrier 5" carrier labels can be resolved into the IP address "128.231.1.57" and "141.231.1.52", respectively. In this instance, the call server 102's logic would check the call server database to see whether there is only one gateway corresponding to the carrier label, and if yes, simply resolve to the corresponding IP address indicated within the database.

In another example where a carrier has plural gateways in the "Call To" location, the resolving of the carrier label into a gateway IP address may be more involved. For example, since the FIG. 8 data shows that Carrier 2 and Carrier 3 each own two Pittsburgh gateways (i.e., gateways 210P$_6$ and 210P$_7$ for Carrier 2, and 210P$_8$ and 210P$_9$ for Carrier 3), the call server 102' must have additional logic to decide which gateway of Carrier 2 and which gateway of Carrier 3 to select. As one non-limiting example, the call server 102's logic may be designed to select a gateway having a lowest "Cost". In such example, the call server 102' would contain logic to compare the two "0.020/min" and "0.019min" costs of the two Carrier 2 gateways, and would resolve the "Carrier 2" carrier label to the IP address "204.231.1.100" of the Carrier 2 gateway 210P$_7$ having a lowest cost. Similarly, the call server 102' would compare the two "0.020/min" and "0.022 min" costs of the two Carrier 3 gateways, and would resolve the "Carrier 3" carrier label to the IP address "199.168.16.124" of the Carrier 3 gateway 210P$_8$ having a lowest cost.

Practice of embodiment is in no way limited to looking at "Cost" or even to the specific parameters listed anywhere within this disclosure. Instead, the call server 102's logic may be designed to look at any singular parameter, or any plural parameters, of interest. Further, practice of embodiments is in no way limited to looking at the same parameter(s) for resolving each carrier label. For example, the call server 102's logic may be designed to look at "Cost" for resolving the "Carrier 2" label, and may be designed to look at a predetermined (e.g., weighted) combination of "Quality" and "Capacity" for resolving the "Carrier 3" label.

In another example, it may be decided that all the gateways of a particular carrier should be used to attempt handoffs to. For example, if the gateways of a particular carrier are lower in cost than any other carrier's gateway, then all the gateways of the low-cost carrier may be included in the hierarchy list. FIG. 8's table shows such a situation where all of the "Carrier 1" gateways are lower in cost ($0.015/min) than any of the gateways of the other carriers. As another example, if a handing-off carrier has a contractual relationship with a partner carrier, then all the gateways of the partner carrier may be included in the hierarchy list. For example, a handing-off carrier might have a contractual relationship with Carrier 1, with a promise to give Carrier 1 gateways the right-of-first-refusal for gateway handoffs. In such a situation, all the gateways of the partnered carrier may be included in the hierarchy list.

The above SIP message Example 2 (reprinted hereat for convenience) includes one non-limiting example "failover" mechanism which may be used to indicate a number of gateways into which a carrier label should be resolved.

SIP Example 2

---

SIP Example 2:

```
SIP/2.0 300 Multiple choices
      CSeq: 555355 INVITE
      Call-ID: 1243657567_119355492@192.168.23.11
      From: <sip:+19195551212@192.168.23.11>;tag=gK006259ad
      To: <sip:+14128560600@192.168.3.88>
      Via: SIP/2.0/UDP
192.168.3.88;branch=z9hG4bKf38d.662eddc6.0,SIP/2.0/UDP
192.168.23.11:5060;branch=z9hG4bK00B80126aea5dfd33b0
      Contact:
<sip:+14128560600;npdi;rn=+14126680976@CARRIER1:5060;transport=udp>;q=0
.99;failover=all
      Contact:
<sip:+14128560600@CARRIER4:5060;transport=udp>;q=0.98;failover=0
```

-continued

SIP Example 2:

Contact:
<sip:+14128560600@CARRIER5:5060;transport=udp>;q=0.97;failover=0
Contact:
<sip:+14128560600@CARRIER2:5060;transport=udp>;q=0.96;failover=0
Contact:
<sip:+14128560600@CARRIER3:5060;transport=udp>;q=0.95;failover=0
Content-Length: 0

More particularly, the "failover=0" message portion which is associated with ones of the "Contact" lines, is an indicator that each associated carrier label (e.g., "Carrier 4", "Carrier 5", "Carrier 2", "Carrier 3") should be resolved into a singular gateway IP address. That is, handoff should be attempted to only a singular gateway of each indicated carrier, irrespective of how many gateways that carrier might own within the "Call To" location. As one example mode of operation, the call server 102' may, after resolving the label into a first IP address, reference the provided failover value for guidance to see whether the label should be resolved into additional IP addresses. In the "failover=0" example, the "0" is indicative that no further rounds of resolving into additional IP addresses is instructed. With the FIG. 8 data, if: "Carrier 2" was the carrier label SIP instructed; "failover=0" was SIP instructed; and the call server 102's logic was designed to look for lowest "Capacity", then the call server 102's logic would output only IP address "204.231.1.100" corresponding to the Carrier 2 gateway 210P$_7$ currently operating at a "88% Capacity".

In contrast to the "failover=0" example, the "failover=all" message portion which associated with the first of the SIP Example 2 "Contact" lines, is an indicator that the associated carrier label (e.g., "Carrier 1") should be resolved into gateway IP addresses of each (all) of the gateways of that carrier. That is, handoff should be attempted to every gateway of that carrier, irrespective of how many gateways that carrier might own within the "Call To" location. As one example mode of operation, the call server 102' may, after resolving the label into a first IP address, reference the provided failover value for guidance to see whether the label should be resolved into additional IP addresses. In the "failover=all" example, the "all" may be indicative that further rounds of resolving into additional IP addresses is instructed, and that rounds of resolving should continue until all gateway IP addresses of that carrier are used. With the FIG. 8 data, since the "Carrier 1" was the carrier label SIP instructed together with "failover=all"; the call server 102's logic would output all of the Carrier 1 gateway IP addresses (216.231.13.135; 216.231.13.136; 216.231.13.137; 216.231.13.138; 216.231.13.139) to be used (e.g., sequentially) for gateway handoff attempts.

To conclude the FIG. 7 example, the SIP Example 2 message would ultimately result in nine (9) gateways of five (5) carriers being selected as candidate gateways to which to attempt handoff to. The darkened cells of the right-most FIG. 7 column flag the nine gateways which would be selected, while the numbers 1-9 within the darkened cells are used to visually indicated the hierarchy order in which gateway handoff would be attempted. Accordingly, the SIP Example 2 message would be resolved into the corresponding nine gateway IP addresses of: 216.231.13.135; 216.231.13.136; 216.231.13.137; 216.231.13.138; 216.231.13.139; 128.231.1.57; 141.231.1.52; 204.231.1.100 and 199.168.16.124. In short, if handoff-attempt-to-handoff-attempt were unsuccessful, the call server would make nine attempts at handoff with the above SIP message 2 example, proceeding sequentially along the numbers 1-9 from lowest-to-highest. In contrast, if one of the handoff attempts was successful, the logic of the call server would stop further handoff attempts such that fewer than nine attempts would be made.

Practice of embodiments is not limited to resolving a carrier label to a singular gateway IP address or to all gateway IP addresses of a carrier. More particularly, an integer number may be used to indicate an intermediate number of gateway IP addresses that a carrier label should be resolved into. For example: a "failover=2" may be in indicator that a carrier label should be resolved into three (3) gateway IP addresses. As one example mode of operation, the call server 102' may, after resolving the label into a first IP address, reference the provided failover value for guidance to see whether the label should be resolved into additional IP addresses. In the "failover=2" example, the "2" (i.e., a non-zero integer) is indicative that at least one further round of resolving into additional IP addresses is instructed. For each further round of resolving, the logic may be designed to: resolve into another IP address; subtract "1" from the prior failover value; store the remainder as an updated failover value, and then reference the stored remainder to see whether the label should be resolved into additional IP addresses. Further rounds of resolving would continue until the failover value is decremented to failover=0. With the FIG. 8 data, if: "Carrier 1" was the carrier label SIP instructed; "failover=3" was SIP instructed; and the call server 102's logic was designed to look for lowest "Capacity", then the call server 102's logic would output three (3) IP address (216.231.13.139; 216.231.13.138; 216.231.13.137) corresponding to the three (out of five) Carrier 1 gateways having the three lowest current operating capacities (54%; 58%; 65%, respectively).

Practice of embodiments is not limited to having respective "failover" message portions associated with the respective "Contact" lines as shown in the above SIP Example 2. As one non-limiting alternative example, the respective "failover" message portions might be grouped together and provided at a differing location within a SIP message. Such grouped "failover" message portions may, for example, correspond to and be ordered in a same order as the hierarchical listing of carrier labels. That is, a first "failover" message portion within the group may correspond to a first listed carrier label, a second may correspond to a second listed carrier label, etc. As another alternative, the "failover" message portions may be provided via a different (e.g., subsequent) SIP message or via a differing channel of communication.

Next, FIGS. 9-16 illustrate flow logic or methods of example embodiments. It is understood that such flow logic and methods provide merely an example of the many different types of functional arrangements that may be employed to implement operation of portions of the routing engine 70 and call server 102 as described herein. Such flow logic and methods illustrate example embodiments for performing intelligent gateway handoffs in order to enhance an efficiency of communication sessions.

Figure 9:
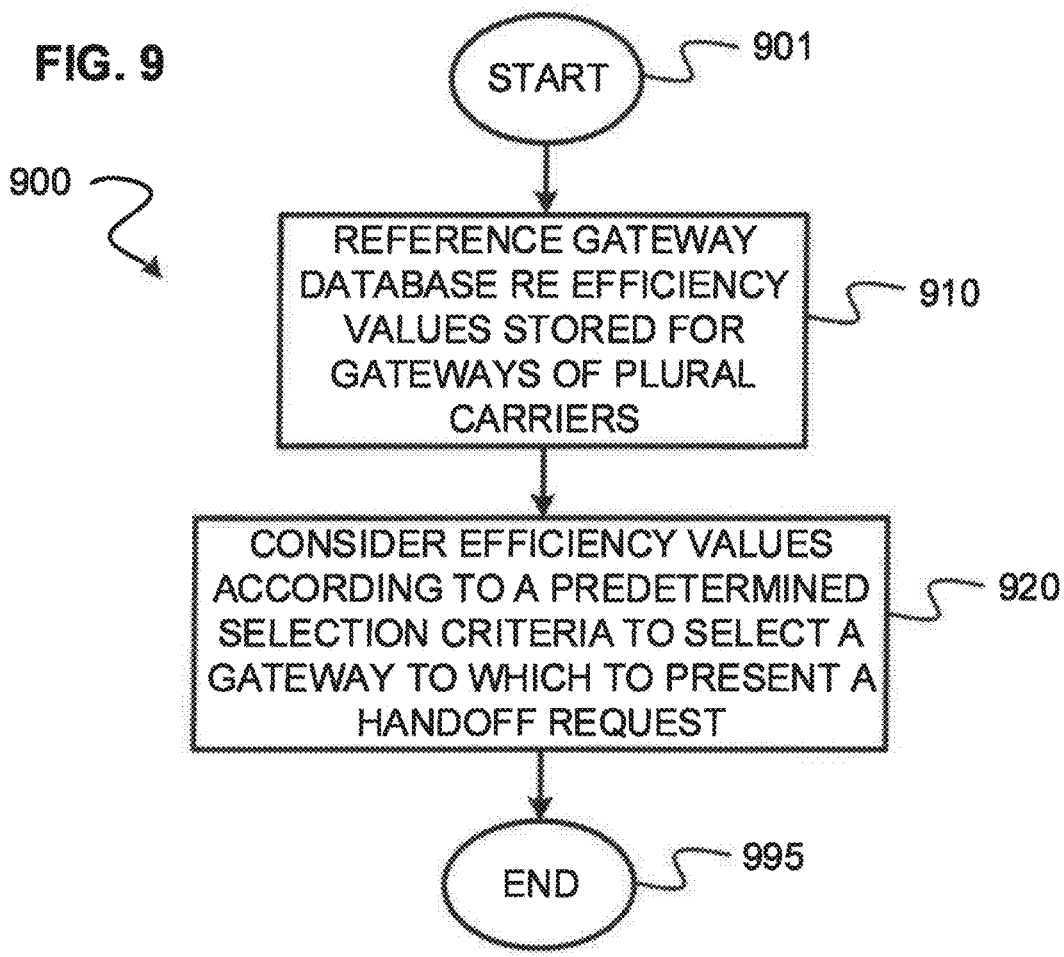
FIGS. 9-14 illustrate flow or logic examples which are useful in explaining example embodiments of the present disclosure.

More particularly, FIG. 9 illustrates an example flow logic or method 900. At operation 901, the flow is started. Next, at operation 910, a gateway database is accessed to access gateway data including efficiency values (e.g., distance, latency, quality, cost, unused capacity, etc.) for the gateways. At operation 920, the accessed efficiency values are considered per a predetermined selection criteria to select a gateway to which to present a handoff request. As one example, the operation may be designed to consider latency values as the efficiency values, and to select a gateway having a shortest latency value. With the FIG. 8 data, the Carrier 4 gateway 210P$_{10}$ having a latency of only 190 mS would be selected. At operation 995, the flow is ended. The FIG. 9 operations may be performed by the routing engine 70, the call server 102, or any other components of the infrastructure, or any combinations thereof.

Figure 10:
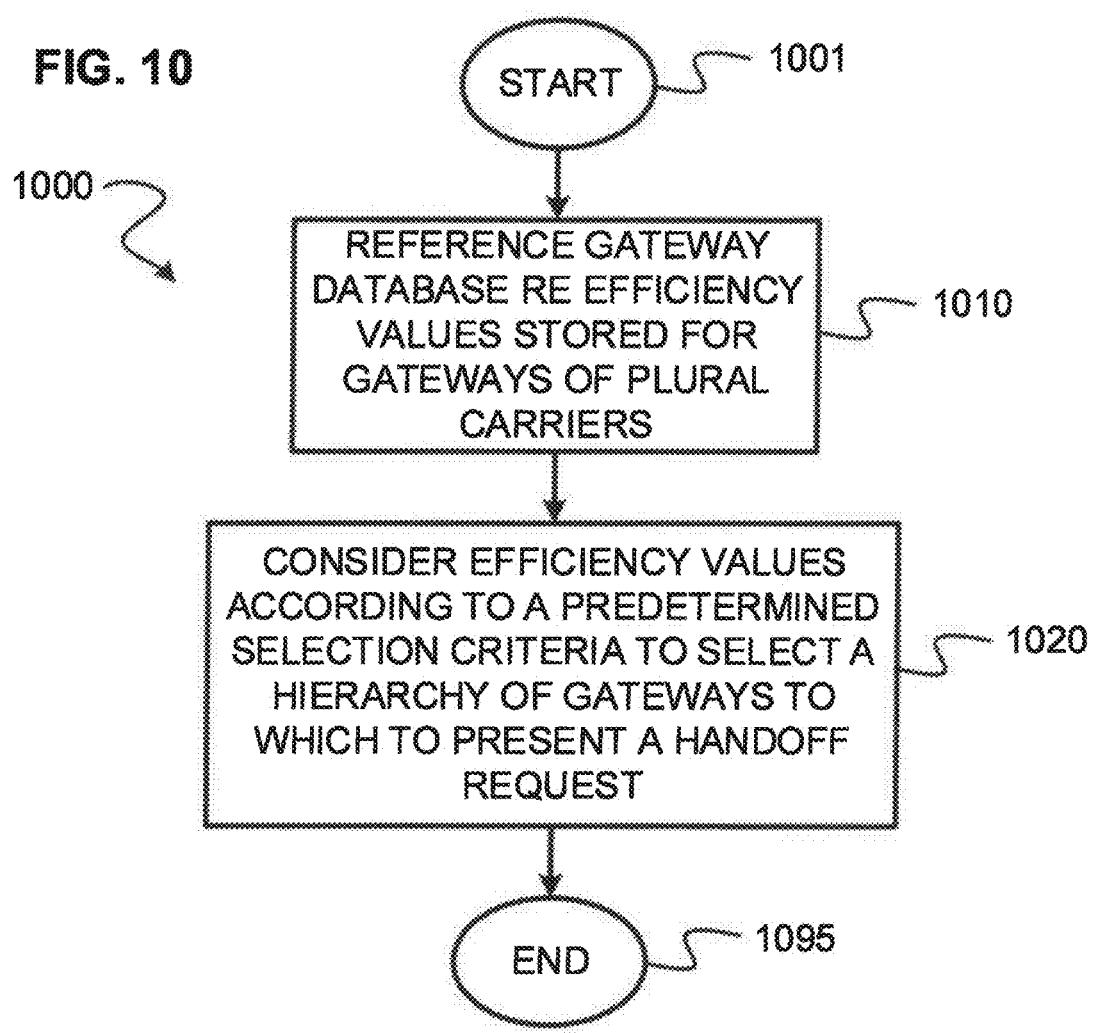

FIG. 10 illustrates an example flow logic or method 1000 which is similar to flow logic 900, but which selects a hierarchy of plural gateways. At operation 1001, the flow is started. Next, at operation 1010, a reference gateway database is accessed to access gateway data including efficiency values (e.g., distance, latency, quality, cost, unused capacity, etc.) for the gateways. At operation 1020, the accessed efficiency values are considered per a predetermined selection criteria (e.g., formula, weighting, threshold, etc.) to select a hierarchy of gateways to which to present a handoff request. As one example, the operation may be designed to consider network capacity values as the efficiency values, and to select a predetermined number of (e.g., three) gateways having the lowest used capacities (or the highest unused capacities). With the FIG. 8 data, the Carrier 1 gateways 210P$_5$, 210P$_4$, 210P$_3$, having used capacities of only 54%, 58% and 65%, respectively, would be selected. At operation 1095, the flow is ended. The FIG. 10 operations may be performed by the routing engine 70, the call server 102, or any other components of the infrastructure, or any combinations thereof.

Figure 11:
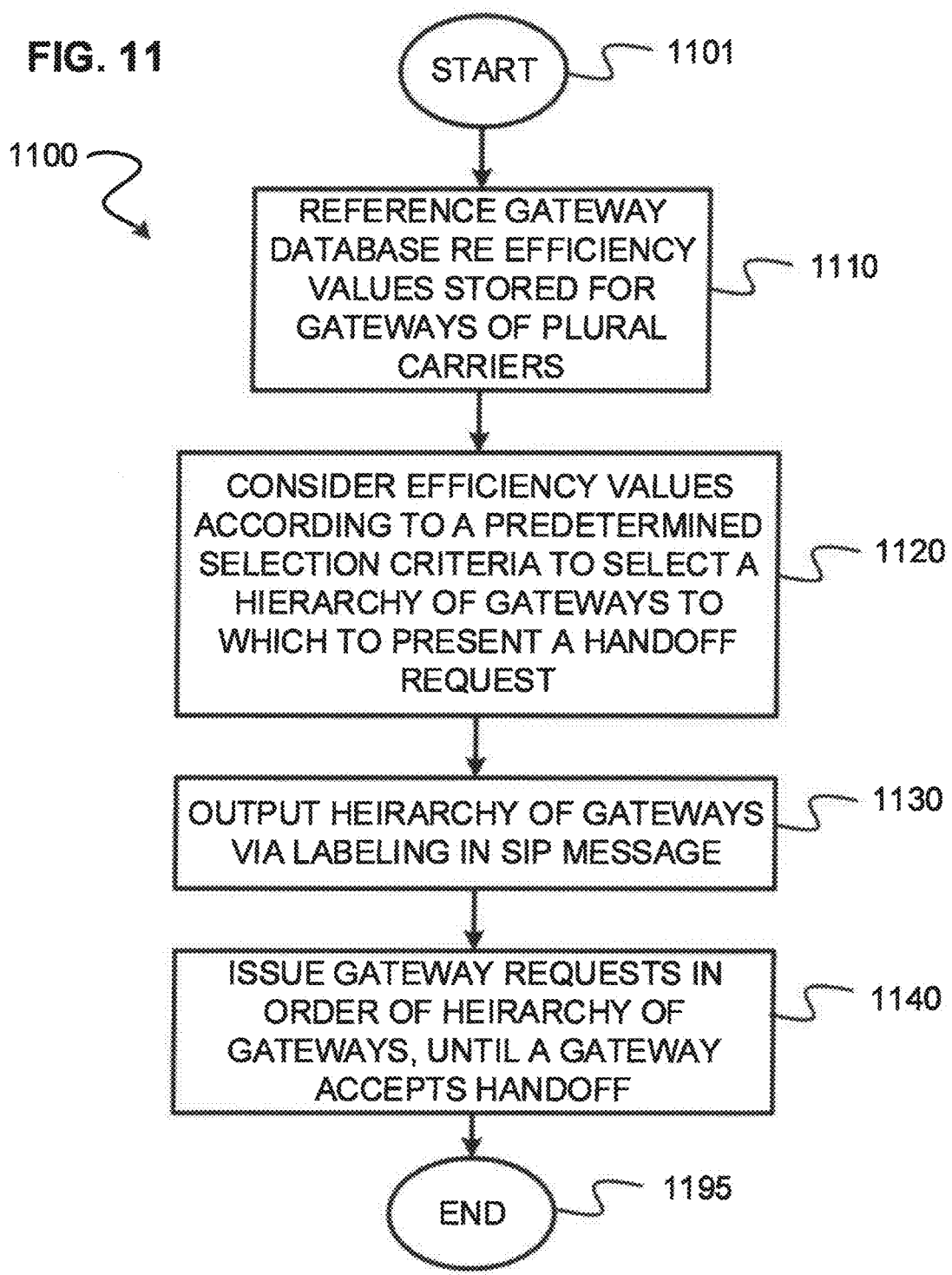

FIG. 11 illustrates an example flow logic or method 1100 in which a SIP message is used to output a hierarchy of selected gateways. At operation 1101, the flow is started. Next, at operation 1110, a reference gateway database is accessed to access gateway data including efficiency values (e.g., distance, latency, quality, cost, unused capacity, etc.) for the gateways. At operation 1120, the accessed efficiency values are considered per a predetermined selection criteria (e.g., formula, weighting, threshold, etc.) to select a hierarchy of gateways to which to present a handoff request. As one example, the operation may be designed to consider connection quality values as the efficiency values, and to select a predetermined number of (e.g., two) gateways which have historically provided the highest average quality levels. With the FIG. 8 data, the Carrier 4 gateway 210P$_{10}$ (Quality=10) and the Carrier 5 gateway 210P$_{11}$ (Quality=9) would be selected. At operation 1130, the selected hierarchy of gateways is output via a SIP message (as discussed previously), and at operation 1140, the gateway handoff requests are issued in the order of the hierarchy of gateways. At operation 1195, the flow is ended. The FIG. 11 operations may be performed by the routing engine 70, the call server 102, or any other components of the infrastructure, or any combinations thereof.

Figure 12:
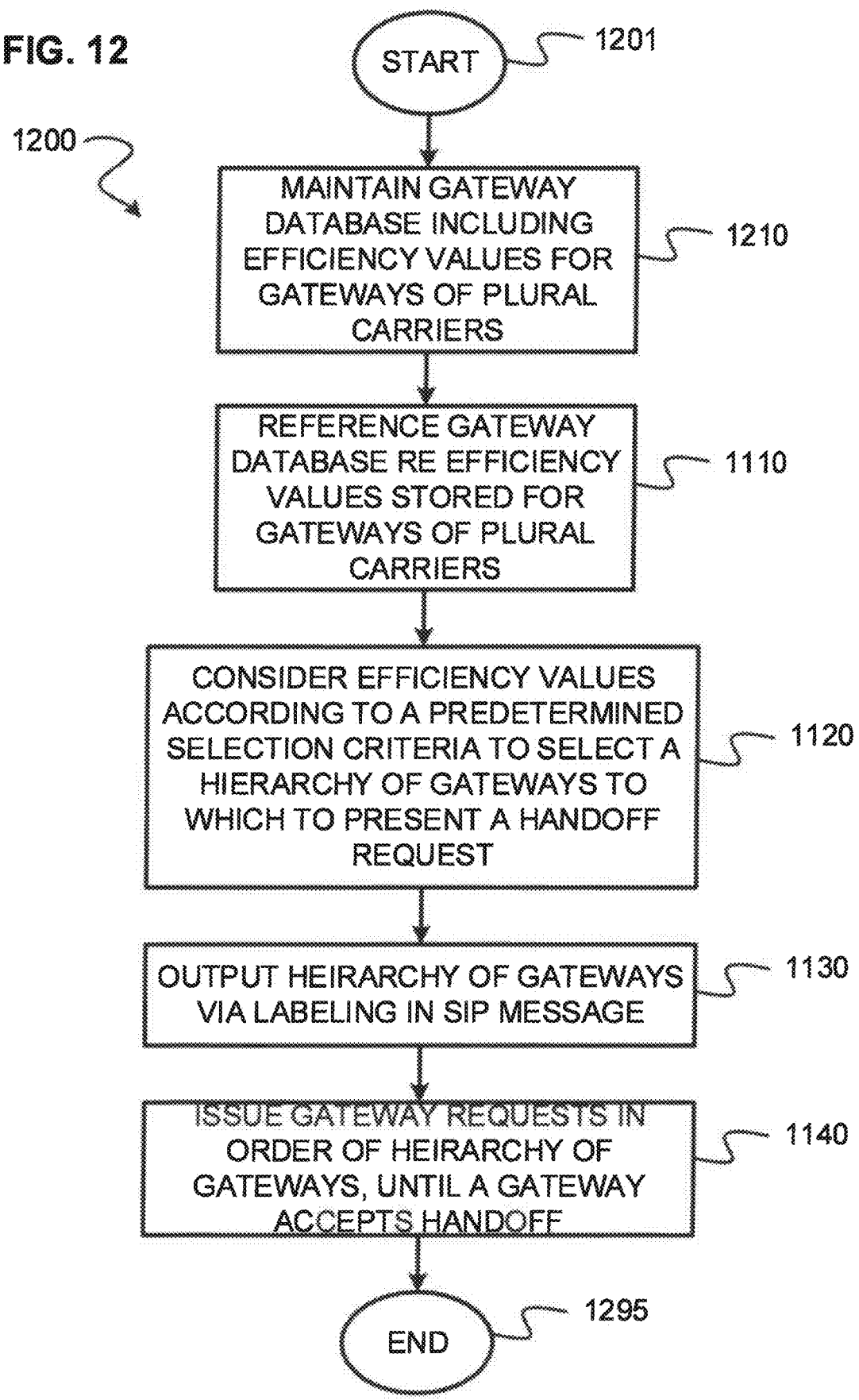

FIG. 12 illustrates an example flow logic or method 1200 which is similar to FIG. 11's flow logic 1100, with the exception that a gateway database is maintained rather than just being accessed. More particularly, after starting at operation 1201, the operation 1210 maintains the gateway database including the efficiency values for gateways of plural carriers. For example, the data within the database may be a portion of, and retrieved or updated periodically (for example) from, the master database 50 or a regional database. Alternatively, the data may be retrieved or updated in real-time from the master database 50 or a regional database, whenever a gateway selection operation is called for. As another example, some database entries may be individually maintained locally regarding parameters measured locally. For example, latency experienced by a call server is best measured at the call server, so is best updated by the call server. Thus the call server may measure the latency, and keep appropriate entries of the data up to date with most recently experienced latency values. Other operations are the same as previously discussed, and at operation 1295 the flow is ended. The FIG. 11 operations may be performed by the routing engine 70, the call server 102, or any other components of the infrastructure, or any combinations thereof.

Figure 13:
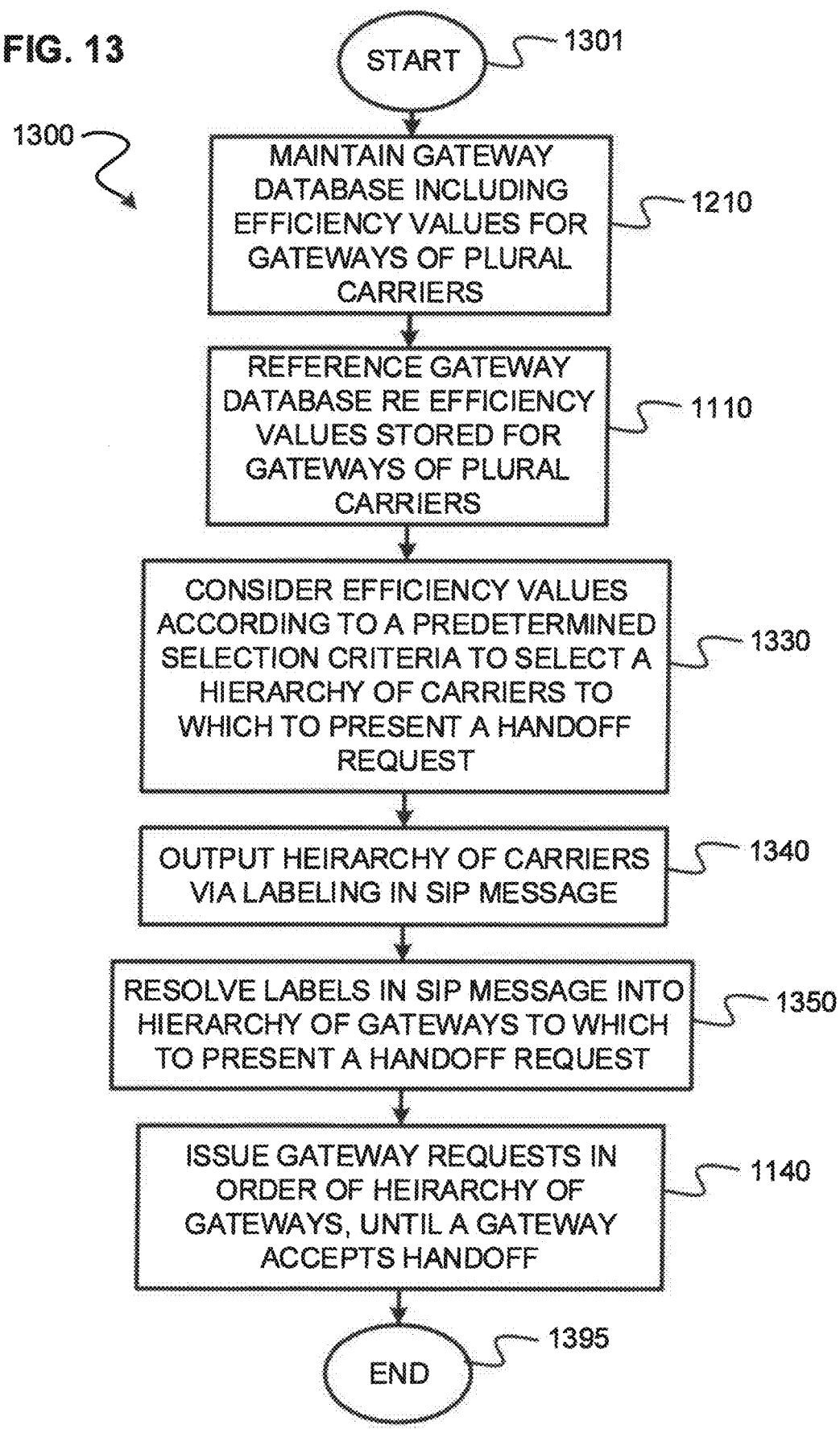

As to other data which the call server may locally monitor and perform database updating, such may include: available networks, detected signal strength of communication link(s), protocol and buffer statistics and analysis, including data or packet sequences received or packets dropped, network latency, jitter, delay, and other qualitative measures (e.g., based on ack/nack and other messages received from the communication devices 206, 209 and/or other network components), etc., the location(s) of the communication devices 206, 209, including environmental and/or geographical factors associated with such locations, the performance of access points and other network components, past interactions between or among communication devices, access points and other network components, the context of the conversation during a voice call, etc FIG. 13 illustrates an example flow logic or method 1300 similar to the flow logic 1200, but which further operates to determine a hierarchy of carriers. More particularly, after both a start operation 1301 and previously-discussed operations 1210 and 1110, operation 1330 considers the accessed efficiency values per a predetermined selection criteria (e.g., formula, weighting, threshold, etc.) to select a hierarchy of carriers to which to present a handoff request. As one example, the operation may be designed to consider costs as the efficiency values, and to select a predetermined number of (e.g., five) carriers which are the lowest cost carriers. With the FIG. 8 data, Carrier 1 (lowest Cost=$0.015/min), Carrier 4 (lowest Cost=$0.017/min), Carrier 5 (lowest Cost=$0.018/min), Carrier 2 (lowest Cost=$0.019/min), Carrier 3 (lowest Cost=$0.020/min) would be selected. At operation 1340, the selected hierarchy of carriers is output via a SIP message including carrier labels (as discussed previously). Such operation 1340 may be performed by the routing engine 70', or may be performed by another infrastructure component or in the cloud. At operation 1350, the labels in the SIP message are resolved into a hierarchy of gateways to which to present a handoff request, and at operation 1140, the gateway handoff requests are issued in the order of the hierarchy of gateways. Operations 1350 and 1140 may be performed by the call server 102', or may be performed by another infrastructure component or in the cloud. At operation 1395, the flow is ended.

Figure 14:
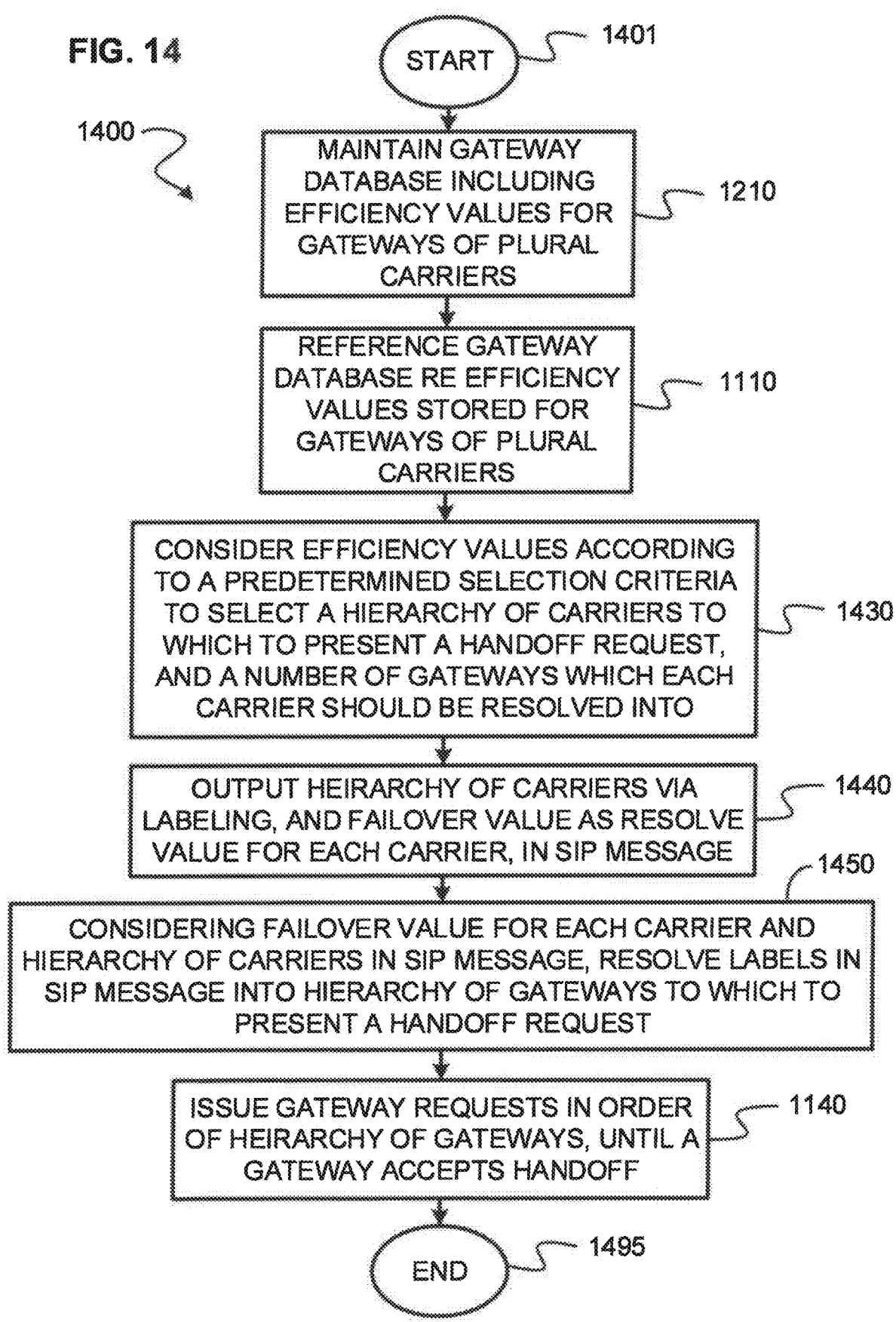

FIG. 14 illustrates an example flow logic or method 1400 similar to the flow logic 1300, but which further operates to determine a number of gateways which each carrier should be resolved into. More particularly, after both a start operation 1401 and previously-discussed operations 1210 and 1110, operation 1430 considers the accessed efficiency values per a predetermined selection criteria (e.g., formula, weighting, threshold, etc.) to select both a hierarchy of carriers to which to present a handoff request and a number of gateways which each carrier should be resolved into (failover value). An example carrier selection is as discussed previously with respect to FIG. 13, while an example number of gateways determination will be discussed ahead with respect to operations of FIG. 14.

At operation 1440, the selected hierarchy of carriers and the failover values (as the number of gateways which each carrier should be resolved into) are output via a SIP message including carrier labels and failover values (as discussed previously). Such operation 1440 may be performed by the routing engine 70', or may be performed by another infrastructure component or in the cloud. At operation 1450, the labels in the SIP message and the failover value are used to resolve into a hierarchy of gateways to which to present a handoff request, and at operation 1140, the gateway handoff requests are issued in the order of the hierarchy of gateways. Operations 1450 and 1140 may be performed by the call server 102', or may be performed by another infrastructure component or in the cloud. At operation 1495, the flow is ended.

FIG. 15 illustrates an example flow logic or method 1430' showing one example (non-limiting) implementation of FIG. 14's operation 1430. More particularly, after a start operation 1430-0, operation 1430-1 considers Costs as the efficiency values and includes carriers offering cost of less than $0.025/min (for example). Operation 1430-2 arranges the selected carriers in hierarchy order according to lowest-to-highest cost. With the FIG. 8 data, again Carrier 1 (lowest Cost=$0.015/min), Carrier 4 (lowest Cost=$0.017/min), Carrier 5 (lowest Cost=$0.018/min), Carrier 2 (lowest Cost=$0.019/min), Carrier 3 (lowest Cost=$0.020/min) would be selected and arranged as stated. At operation 1430-3, an initial failover value would be set to Failover=0 for each selected carrier. Next, operation 1430-4 considers Costs as the efficiency value for each gateway of a selected carrier (e.g., Carrier 1), and increases the failover value of the carrier by one for each carrier gateway beyond a first gateway, having cost less than or equal to $0.016/min (for example). At this flow point, the FIG. 8 Carrier 1 carrier data would result in "failover=4". Operation 1430-5 checks whether all gateways (GW) of the selected carrier have a cost less than or equal to $0.016/min (for example). If yes, operation 1430-6 sets the carrier's failover value to "failover=ALL", and flow proceeds to operation 1430-7. If no, the flow proceeds directly to operation 1430-7. Operation 1430-7 checks to see whether all the selected carriers have been considered. If no, a next selected carrier (e.g., Carrier 4) is considered per operations 1430-4, 1430-5, 1430-6 and 1430-7. If yes, the flow is ended at operation 1430-10. With the FIG. 8 data, the FIG. 15 flow/logic would result in only the Carrier 1 label being associated with failover=all, and the other four selected Carrier 4, Carrier 5, Carrier 2, Carrier 3 carriers would be associated with failover=0, as shown previously via the SIP Example 2. The FIG. 15 operations may be performed by the routing engine 70', or may be performed by another infrastructure component or in the cloud.

FIG. 16 illustrates a flow logic or method 1450' showing one example (non-limiting) implementation of FIG. 14's operation 1450. More particularly, after a start operation 1450-0, operation 1450-1 accesses a failover value in the SIP message for a first selected carrier. For the above SIP Example 2, "Carrier 1" is the first selected carrier, and its failover value within the SIP message is "failover=all". Operation 1450-2 considers cost as the efficiency values for each gateway of the selected carrier, and outputs (resolves into) an IP address of the lowest cost carrier gateway not yet selected. With the FIG. 8 data, all of Carrier 1's gateways have a same cost (Cost=$0.015/min), so as one example, a first FIG. 8 listed $210P_1$ gateway may be selected. Practice of embodiments is not limited to selecting the first listed gateway or to selecting the gateways in database-listed order, and other approaches may be used (e.g., random selection). Operation 1450-3 checks to see whether the carrier's failover value is "failover=ALL". If yes, flow proceeds to operation 1450-4 which checks to see whether all gateways of the selected carrier have been considered. If a result of the 1450-4 operation is no, flow loops through operations 1450-2, 1450-3 and 1450-4 again to output (resolve into) another gateway IP address of the carrier. With the FIG. 8 data, three more (for a total of four) loop-throughs of operations 1450-2, 1450-3 and 1450-4 would occur such that the "Carrier 1" label would be resolved into all five Carrier 1 IP addresses of 216.231.13.135, 216.231.13.136, 216.231.13.137, 216.231.13.138 and 216.231.13.139.

Once operation 1450-4 determines that all gateways of the selected carrier have been considered, flow proceeds (via the YES branch) to operation 1450-5 which checks to see whether all the selected carriers have been considered. If no, a next selected carrier within the SIP message is accessed. For the above SIP Example 2, "Carrier 4" is the next selected carrier, and its failover value is "failover=0". Operation 1450-2 again considers cost as the efficiency values for each gateway of the selected carrier, and outputs (resolves into) an IP address of the lowest cost carrier gateway not yet selected. With the FIG. 8 data, there is only one Carrier 4 gateway (Cost=$0.017/min), so it is the lowest cost Carrier 4 gateway and is selected. Operation 1450-3 checks to see whether the carrier's failover value is "failover=ALL". Since the answer is no regarding the Carrier 4 carrier, flow proceeds to operation 1450-6 which checks to see whether the carrier's failover value is greater than zero (failover>0). Since the answer is no regarding the Carrier 4 failover value, flow proceeds (via the NO branch) to operation 1450-5 which checks to see whether all the selected carriers have been considered.

With the SIP Example 2, similar operations as described in the immediately previous paragraph are conducted (in order) for the Carrier 5, Carrier 2 and Carrier 3 carriers also listed in the SIP Example 2 message, given that each of such carriers also have a failover value of "failover=0". Finally, when operation 1450-5 determines that all selected carriers within the SIP message have been considered, the flow is ended at operation 1430-10.

If the SIP Example 2 had had a carrier with a numerical failover greater than zero "0", flow from the operation 1450-6 would have proceeded (via the YES branch) to operation 1450-7 which would subtract one (1) from the failover value, and thereafter, operations would have looped through operations 1450-2, 1450-3 and 1450-6 again to output (resolve into) another gateway IP address of the carrier. If an example SIP message had contained "Carrier 3" as a carrier label and "failover=1", then with the FIG. 8 example data, two passes through operations 1450-2, 1450-3 and 1450-6 would occur to output (resolve into) the Carrier 3 IP addresses 199.168.16.124 and 199.168.16.125. Once the operation 1450-6 determined that the carrier's decremented failover value is no longer greater than zero (failover=0), flow would proceeds (via the NO branch) to operation 1430-5 as previously discussed.

Regarding timing, in one embodiment, the FIG. 16 flow logic or method would first completely resolve the SIP message into all IP gateway addresses permitted by the SIP message and logic, before starting to issue gateway handoff requests. For example, with the FIG. 7/SIP Example 2 situation, the flow logic or method would first completely resolve into the nine (9) IP gateways addresses 216.231.13.135; 216.231.13.136; 216.231.13.137; 216.231.13.138; 216.231.13.139; 128.231.1.57; 141.231.1.52; 204.231.1.100 and 199.168.16.124 of the selected gateways. Then the call server would next proceed to make nine gateway handoff attempts one-by-one in the IP gateway address order stated. In another (differing) embodiment, the flow logic or method would resolve the SIP message into IP gateway addresses and attempt gateway handoff one-by-one. For example, with the FIG. 7/SIP Example 2 situation, the flow logic or method would first resolve into the first IP gateway address 216.231.13.135 and attempt gateway handoff therewith. If handoff was unsuccessful, the flow logic or method would then resolve into the second IP gateway address 216.231.13.136 and attempt gateway handoff therewith. Such one-by-one resolving and handoff attempts would continue along the hierarchy of gateways until one of the handoff attempts was successful, whereupon the logic of the call server would stop further resolving and handoff attempts. This embodiment may be advantageous over the prior discussed embodiment in that it may result in resolving into fewer IP gateway addresses, which may result in time and bandwidth savings.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method of selecting a gateway to which to present a hand-off request for an outgoing communication session, comprising:
    accessing address information of a target device representing a final termination of the outgoing communication session, the final termination existing within a service area location;
    accessing a gateway database storing gateway data for gateways of plural communication carriers, respectively, the gateway data of each subject gateway including an IP address and at least one connection efficiency value for the subject gateway and further including both carrier identification indicating the communication carrier that owns the subject gateway, and location information indicating a location where the subject gateway is located;
    considering the connection efficiency values of the gateways of the plural communication carriers in the gateway database according to a predetermined selection criteria;
    considering the location information of gateways of the plural communication carriers in the gateway database in view of the service area location of the final termination;
    determining a hierarchical subset list identifying at least one communication carrier having a gateway within the service area location of the final termination, wherein the hierarchical subset list includes labeling within a Session Initiation Protocol (SIP) invite;
    determining a failover value for each communication carrier indicated within the hierarchical subset list, where the failover value of a subject communication carrier defines a number of gateway IF addresses that a subject communication carrier label of the labeling should be resolved into; and
    selecting at least one gateway to which to present the hand-off request based on the connection efficiency values of the gateways, the determined hierarchical subset list, and the determined failover value for each communication carrier indicated within the hierarchical subset list.

2. The method as claimed in claim 1, wherein "q" values within the SIP invite are used to indicate a hierarchy of communication carriers identified within the hierarchical subset list.

3. The method as claimed in claim 1, wherein failover values for the communication carriers in the hierarchical subset listing are included within the SIP invite.

4. The method as claimed in claim 1, the method further comprising:
    receiving the SIP invite including the labeling at a call server, and resolving the labeling in at least one Internet protocol (IP) address of the at least one gateway to which to present the hand-off request.

5. The method as claimed in claim 1, wherein the gateway data contains a separate said at least one connection efficiency value for plural gateways, respectively, of at least one carrier of the plural communication carriers; and
    wherein the considering considers the separate said at least one connection efficiency values, respectively, of the plural gateways of a subject communication carrier, to select the at least one gateway of the subject communication carrier, to which to present the hand-off request.

6. The method as claimed in claim 1, wherein the connection efficiency values for the gateways are more particularly latency values of the gateways, respectively, and wherein the considering considers the latency values via a predetermined latency selection criteria to select the gateway connection.

7. At least one non-transitory machine-readable medium comprising a set of instructions executable on at least one computing device to cause the at least one computing device to select a gateway to which to present a hand-off request for an outgoing communication session, by:
    accessing address information of a target device representing a final termination of the outgoing communication session, the final termination existing within a service area location;
    accessing a gateway database storing gateway data for gateways of plural communication carriers, respectively, the gateway data of each subject gateway including an IP address and at least one connection efficiency value for the subject gateway and further including both carrier identification indicating the communication carrier that owns the subject gateway, and location information indicating a location where the subject gateway is located;
    considering the connection efficiency values of the gateways of the plural communication carriers in the gateway database according to a predetermined selection criteria;

considering the location information of gateways of the plural communication carriers in the gateway database in view of the service area location of the final termination;

determining a hierarchical subset list identifying at least one communication carrier having a gateway within the service area location of the final termination, wherein the hierarchical subset list includes labeling within a Session Initiation Protocol (SIP) invite;

determining a failover value for each communication carrier indicated within the hierarchical subset list, where the failover value of a subject communication carrier defines a number of gateway IP addresses that a subject communication carrier label of the labeling should be resolved into; and selecting at least one gateway to which to present the hand-off request based on the connection efficiency values of the gateways, the determined hierarchical subset list, and the determined failover value for each communication carrier indicated within the hierarchical subset list.

8. The medium as claimed in claim 7, wherein "q" values within the SIP invite are used to indicate a hierarchy of communication carriers identified within the hierarchical subset list.

9. The medium as claimed in claim 7, wherein failover values for the communication carriers in the hierarchical subset listing are included within the SIP invite.

10. The medium as claimed in claim 7, further comprising instructions for:
receiving the SIP invite including the labeling at a call server, and resolving the labeling in at least one Internet protocol (IP) address of the at least one gateway to which to present the hand-off request.

11. The medium as claimed in claim 7, wherein the gateway data contains a separate said at least one connection efficiency value for plural gateways, respectively, of at least one carrier of the plural communication carriers; and
wherein the considering considers the separate said at least one connection efficiency values, respectively, of the plural gateways of a subject communication carrier, to select the at least one gateway of the subject communication carrier, to which to present the hand-off request.

12. The medium as claimed in claim 7, wherein the connection efficiency values for the gateways are more particularly latency values of the gateways, respectively, and wherein the considering considers the latency values via a predetermined latency selection criteria to select the gateway connection.

13. A system for selecting a gateway to which to present a hand-off request for an outgoing communication session, comprising: a processor; and
a non-transitory computer readable medium to store a set of instructions for execution by the processor, the set of instructions to cause the processor to:
access address information of a target device representing a final termination of the outgoing communication session, the final termination existing within a service area location;
access a gateway database storing gateway data for gateways of plural communication carriers, respectively, the gateway data of each subject gateway including an IP address and at least one connection efficiency value for the subject gateway and further including both carrier identification indicating the communication carrier that owns the subject gateway, and location information indicating a location where the subject gateway is located;
consider the connection efficiency values of the gateways of the plural communication carriers in the gateway database according to a predetermined selection criteria;
consider the location information of gateways of the plural communication carriers in the gateway database in view of the service area location of the final termination;
determine a hierarchical subset list identifying at least one communication carrier having a gateway within the service area location of the final termination, wherein the hierarchical subset list includes labeling within a Session Initiation Protocol (SIP) invite;
determine a failover value for each communication carrier indicated within the hierarchical subset list, where the failover value of a subject communication carrier defines a number of gateway IP addresses that a subject communication carrier label of the labeling should be resolved into; and
select at least one gateway to which to present the hand-off request based on the connection efficiency values of the gateways, the determined hierarchical subset list, and the determined failover value for each communication carrier indicated within the hierarchical subset list.

14. The system as claimed in claim 13, wherein "q" values within the SIP invite are used to indicate a hierarchy of communication carriers identified within the hierarchical subset list.

15. The system as claimed in claim 13, wherein failover values for the communication carriers in the hierarchical subset listing are included within the SIP invite.

16. The system as claimed in claim 13, further comprising instructions to cause the processor to:
receive the SIP invite including the labeling at a call server, and resolve the labeling in at least one Internet protocol (IP) address of the at least one gateway to which to present the hand- off request.

17. The system as claimed in claim 13, wherein the gateway data contains a separate said at least one connection efficiency value for plural gateways, respectively, of at least one carrier of the plural communication carriers; and
wherein the consider operation considers the separate said at least one connection efficiency values, respectively, of the plural gateways of a subject communication carrier, to select the at least one gateway of the subject communication carrier, to which to present the hand-off request.

18. The system as claimed in claim 13, wherein the connection efficiency values for the gateways are more particularly latency values of the gateways, respectively, and wherein the consider operation considers the latency values via a predetermined latency selection criteria to select the gateway connection.

* * * * *